US012466819B2

(12) United States Patent
Moghadam

(10) Patent No.: US 12,466,819 B2
(45) Date of Patent: Nov. 11, 2025

(54) TRICYCLIC COMPOUNDS WITH OMA1/OPA1 MODULATORY PROPERTIES

(71) Applicant: 712 North Inc., Oakland, CA (US)

(72) Inventor: Marcel Victor Alavi Khorassani Moghadam, Berkeley, CA (US)

(73) Assignee: 712 North Inc., Oakland, CA (US)

( * ) Notice: Subject to any disclaimer, the term of this patent is extended or adjusted under 35 U.S.C. 154(b) by 673 days.

(21) Appl. No.: 17/784,239

(22) PCT Filed: Dec. 9, 2020

(86) PCT No.: PCT/US2020/064095
§ 371 (c)(1),
(2) Date: Jun. 10, 2022

(87) PCT Pub. No.: WO2021/119183
PCT Pub. Date: Jun. 17, 2021

(65) Prior Publication Data
US 2023/0065809 A1     Mar. 2, 2023

Related U.S. Application Data

(60) Provisional application No. 62/947,678, filed on Dec. 13, 2019, provisional application No. 62/948,139, filed on Dec. 13, 2019.

(51) Int. Cl.
| | |
|---|---|
| *C07D 409/12* | (2006.01) |
| *C07D 265/34* | (2006.01) |
| *C07D 267/16* | (2006.01) |
| *C07D 279/20* | (2006.01) |
| *C07D 405/12* | (2006.01) |
| *C07D 407/06* | (2006.01) |
| *C07D 409/04* | (2006.01) |
| *C07D 409/14* | (2006.01) |
| *C07D 413/04* | (2006.01) |
| *C07D 413/12* | (2006.01) |
| *C07D 471/10* | (2006.01) |
| *C07D 471/22* | (2006.01) |
| *C07D 487/04* | (2006.01) |
| *C07D 498/04* | (2006.01) |
| *C07D 513/04* | (2006.01) |
| *C07F 7/08* | (2006.01) |

(52) U.S. Cl.
CPC ......... *C07D 409/12* (2013.01); *C07D 265/34* (2013.01); *C07D 267/16* (2013.01); *C07D 279/20* (2013.01); *C07D 405/12* (2013.01); *C07D 407/06* (2013.01); *C07D 409/04* (2013.01); *C07D 409/14* (2013.01); *C07D 413/04* (2013.01); *C07D 471/10* (2013.01); *C07D 471/22* (2013.01); *C07D 487/04* (2013.01); *C07D 498/04* (2013.01); *C07D 513/04* (2013.01); *C07F 7/0807* (2013.01)

(58) Field of Classification Search
CPC .. C07D 409/12; C07D 409/04; C07D 409/14; C07D 265/34; C07D 267/16; C07D 279/20; C07D 405/12; C07D 407/06; C07D 413/04; C07D 413/12; C07D 471/10; C07D 471/22; C07D 487/04; C07D 498/04; C07D 513/04; C07F 7/0807

See application file for complete search history.

(56) References Cited

U.S. PATENT DOCUMENTS

| | | | |
|---|---|---|---|
| 3,357,998 A | 12/1967 | Cusic | |
| 4,032,652 A | 6/1977 | Chakrin | |
| 5,366,972 A | 11/1994 | Hargrave | |
| 5,504,104 A | 4/1996 | Ellsworth | |
| 5,607,929 A * | 3/1997 | Nicol | ................... C07D 281/16 540/488 |
| 6,846,840 B2 | 1/2005 | Skibo | |
| 8,557,848 B2 | 10/2013 | Chen | |
| 11,141,385 B2 | 10/2021 | Dong | |
| 2003/0139609 A1 | 7/2003 | Skibo | |
| 2008/0188500 A1 | 8/2008 | Arvanitis | |
| 2012/0178738 A1 | 7/2012 | Becker | |
| 2014/0378451 A1 | 12/2014 | Christou | |
| 2015/0087844 A1 | 3/2015 | Horne | |

(Continued)

FOREIGN PATENT DOCUMENTS

| | | |
|---|---|---|
| WO | 2007143822 A1 | 12/2007 |
| WO | 2018044986 A1 | 3/2018 |
| WO | 2019173761 A1 | 9/2019 |
| WO | 2021237121 A1 | 11/2021 |

OTHER PUBLICATIONS

Alavi Marcel V, OMA1 High-Throughput Screen Reveals Protease Activation by Kinase Inhibitors.,ACS Chem Biol, (2021), 16:2202-2211.
Alavi Marcel V, Tau phosphorylation and OPA1 proteolysis are unrelated events: Implications for Alzheimer's Disease, Biochim Biophys Acta Mol Cell Res., (2021), 1868:119116.

(Continued)

*Primary Examiner* — Sun Jae Yoo

(74) *Attorney, Agent, or Firm* — Collard & Roe, P.C.

(57) ABSTRACT

Tricyclic compounds, and in particular novel dibenzoxazepin derivates are disclosed herein, which were quite surprisingly found as having OMA1 and/or OPA1 modulatory properties. Compounds of present invention may provide useful for the treatment of certain conditions and diseases, which are amenable to OMA1 and/or OPA1-modulatory therapies. Such conditions may include conditions and diseases prevalent in the elderly, including cancer. Pharmaceutical compositions comprising compounds of present invention may be combined with other treatments or further comprise other pharmaceutically active ingredients.

14 Claims, 11 Drawing Sheets

(56) References Cited

U.S. PATENT DOCUMENTS

2016/0103140 A1     4/2016    Chodobski
2018/0371007 A1    12/2018    Moghadam
2019/0049430 A1     2/2019    MacMillan-Crow
2020/0148687 A1     5/2020    Kapoor

OTHER PUBLICATIONS

Alavi Marcel V, Recent advances in, and challenges of, designing OMA1 drug screens, Pharmacol Res, (2022), 176:106063.
Khailova et al., Interaction of Potent Mitochondrial Uncouplers with Thiol-Containing Antioxidants, Antioxidants (Basel), (2019), 8:194.
Li et al., Sulforaphane Activates a lysosome-dependent transcriptional program to mitigate oxidative stress, Autophagy, (2021), 4:872-887.
Nieman et al., Targeting Nitric Oxide Production in Microglia with Novel Imidazodiazepines for Nonsedative Pain Treatment, ACS Chem Neurosci, (2020), 11:2019-2030.
1,3-bis[(4-methylphenyl)sulfanyl]dibenzo[b,f][1,4]oxazepin-11(10H)-one; PubChem CID: 1826134.
10-methylsulfanyl-5H-benzo[b][1,4]benzothiazepin-6-one; PubChem CID: 10221164.
6-cyclopropylidene-5H-benzo[b][1,4]benzoxazepine; PubChem CID: 143592935.
7-(Cyclopropylmethyl)-5,6-dihydrobenzo[b][1,4]benzoxazepine; PubChem CID: 154301867.
N-cyclopropyl-4-(dibenzo[b,f][1,4]oxazepin-11-yl)piperazine-1-carbothioamide; PubChem CID: 17600285.
International Search Report from Appl. No. PCT/US2020064095, mailed on Apr. 7, 2021.

\* cited by examiner

A vehicle only

D compound VII

B MMP2/9 inhibitor IV

E compound IV

C amoxapine

F compound V

A

B w/o CCCP

C

1 µM CCCP

TRICYCLIC COMPOUNDS WITH OMA1/OPA1 MODULATORY PROPERTIES

CROSS-REFERENCE TO RELATED APPLICATIONS

This application claims the benefit under 35 U.S.C. § 119(e) of U.S. Provisional Application No. 62/947,678 filed on Dec. 13, 2019 and U.S. Provisional Application No. 62/948,139 filed on Dec. 13, 2019, each of which is incorporated by reference in its entirety.

FIELD

The present invention relates to tricyclic compounds disclosed herein as having OMA1 and/or OPA1 modulatory properties, pharmaceutical compositions comprising these compounds, chemical processes for preparation of these compounds, and their use as pharmacological tools or in the treatment of diseases linked to OMA1 and/or OPA1 in cells, animals and in particular humans. More particularly, the present disclosure provides novel dibenzoxazepin derivates, chemical routes for their synthesis, and methods of use of such compounds.

BACKGROUND

Mitochondria are membrane-enclosed organelles, which accommodate many rate-limiting reactions of the cellular energy-metabolism. The proton-motive force $\Delta\psi$ across the mitochondrial inner membrane drives ATP synthesis, which is regulated by the mitochondrial surface-to-volume ratio. To this end, mitochondria form dynamic networks of interconnected tubules that are maintained by balanced fission and fusion. In addition, fusion with wild-type mitochondria can attenuate mtDNA mutations through cross-complementation between organelles. Further, fission and selective fusion can sort out non-functional mitochondria which are tagged by PINK1/parkin for lysosomal degradation (i.e., mitophagy). Fusion can protect mitochondria from mitophagy and redistribute fatty acids under conditions of starvation. Above all, the disintegration of the mitochondrial network correlates with outer membrane permeabilization and cytochrome c release, which are critical apoptotic signaling events.

The mitochondrial fission and fusion machineries on the outer and inner membrane are built around four essential dynamin-related GTPases, DNM1L (DRP1), MFN1, MFN2, and OPA1. OPA1 is a mitochondrial inner membrane fusion protein with two distinct functions: i) organizing the inner membrane and ii) promoting outer membrane permeabilization and cytochrome c release. These functions are regulated by proteolytic OPA1 hydrolysis by the two zinc-dependent mitochondrial inner membrane proteases OMA1 and YME1L1 (i-AAA). OPA1 is anchored to the inner membrane by an amino-terminal transmembrane domain, which is separated upon cleavage from the carboxyl-terminal GTPase and coiled-coiled domains. Proteolytic cleavage of the membrane-anchored long OPA1 (L-OPA1) hence can release short OPA1 (S-OPA1) from the membrane, which correlates with outer membrane permeabilization, cytochrome c release and apoptotic cell death.

OMA1 cleaves OPA1 at the Si cleavage site to generate S-OPA1 under stress conditions, while YME1L1 cleaves a subset of OPA1 isoforms at the S2 cleavage site (about 14 to 53 amino acids downstream of Si) to adjust the L-OPA1 to S-OPA1 ratio to the energy-metabolic needs of the cell (see FIG. 1A and Alavi 2019). The interplay of these two proteases thus can regulate the mitochondrial capacity and determine threshold levels for outer membrane permeabilization. In addition, the rhomboid protease PARL, the serine protease HTRA2 (OMI), and the m-AAA proteases AFG3L2 and SPG7 (paraplegin) can indirectly regulate the ratio of L-OPA1 to S-OPA1. The OMA1 protease shows little activity under physiological conditions but is activated by cellular stress, such as increased reactive oxygen species, heat challenge, proteotoxicity or dissipation of the membrane potential $\Delta\psi$. OMA1 has only a limited number of known substrates, which include PGAM5, a phosphatase regulating DRP1, DELE1, a signaling peptide evoking the integrated stress response, and misrouted PINK1.

Mitochondria are critical for cancer, because cancer cells largely adopt aerobic glycolysis (aka Warburg effect) releasing many metabolites from the Krebs cycle to reinforce cell growth and proliferation. Fused mitochondria have a considerably reduced surface-to-volume ratio and usually are seen in cells with high ATP-dependent energy demand Concurrently many cancer cells show fragmented mitochondria because of their unique energy metabolism, which is optimized for efficient cell proliferation. Interestingly, cancer cells and stem cells share the same energy metabolism (i.e. efficient production of proteins, nucleotides and lipids) and hence share the similar fragmented mitochondrial morphology. Changes in the dynamic mitochondrial network, accordingly, can influence the identity, self-renewal capacity and commitment of stem cells. Also activated T lymphocytes display a fragmented mitochondrial morphology while memory T cells on the other hand are quiescent, depend on oxidative phosphorylation, and consequently show a more fused mitochondrial morphology.

OMA1 and OPA1 are not root causes for cancer but contribute to tumor progression and metastasis downstream of tumor protein p53 and MYC (Alavi 2019). Yet, OMA1 in cancer cells functions not any different than in other cell types. That is, restrained OMA1 activity can render cells more resilient, while OMA1 activation can promote cell death (WO 2018/102,672). Accordingly, decreased OMA1 expression levels predict poor overall survival for certain cancer, while increased OMA1 levels can protect cells. A number of cancer drugs can deploy their cytostatic and cytotoxic effects via OMA1/OPA1. For example, sorafenib induced rapid mitochondrial fragmentation, cytochrome c release and apoptosis in hepatocellular carcinoma cells, which involved loss of OPA1 and which was further amplified by OPA1 knock-down (Zhao et al. 2013; see also FIG. 1D). Also cryptolepine and IR-783 inhibited tumor cell growth and at the same time led to dose-dependent OPA1 protein depletion (Pal et al. 2017; Tang et al. 2018). Another study demonstrated p53-dependent OPA1 cleavage in cisplatin treated human cervical and ovarian cancer cell lines (Kong et al. 2014). OMA1 knock-down prevented OPA1 cleavage, reduced apoptosis, and conferred chemoresistance in these experiments (Kong et al. 2014). Accordingly, rat neuroblastoma cells selected for cisplatin survival showed increased OPA1 protein levels and more fused mitochondria (Santin et al. 2013).

From the aforementioned, it becomes clear that a subject would benefit from activation of the OMA1 protease and/or proteolytic hydrolysis of the OPA1 protein while the subject is being treated for cancer. Depending on the type of cancer and the disease stage, some patients might even benefit from OMA1 activating agents as monotherapy, provided that the tumor relies on the OMA1-OPA1 mechanism for survival. Concluding, there is an unmet need for OMA1 activating agents.

SUMMARY OF THE INVENTION

It is to be understood that both the foregoing general description of the embodiments and the following detailed description are exemplary, and thus do not restrict the scope of the embodiments.

To date, there are still no molecules or agents that can specifically induce OMA1 activation or OPA1 hydrolysis. The present invention solves this problem by providing novel compounds that can induce OPA1 cleavage under mild stress conditions that normally would not result in OMA1 activation. Present disclosure provides novel dibenzoxazepin derivates, methods of their preparation, pharmaceutical compositions comprising dibenzoxazepin compounds, and methods of their use. Quite surprisingly and against all expectations, these novel dibenzoxazepin derivates were found to lower thresholds for OMA1 activation and/or OPA1 cleavage in cellular assays. Therefore, the compounds are useful for the treatment of cancer and other disorders and diseases for which OMA1 activation and/or OPA1 cleavage is desired. In addition, a number of drugs and therapies evoke OPA1 cleavage and/or OMA1 activation. Accordingly, another aspect of the invention is the use of the compounds of present disclosure in combination with other drugs and therapies, whereby the dibenzoxazepin derivates can boost efficacy or lower the effective dose of these drugs and therapies. The compounds can be used in medical therapy, alone or in combination, for example to treat cancer, angiogenesis, cardiovascular disease, neurological disease, eye disease, inflammation, autoimmune disease, and for regulating contraception, and other conditions that are linked to OMA1 and/or OPA1.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF THE DRAWINGS

The drawings described herein are for illustration purposes only. The drawings are not intended to limit the scope of the present disclosure whatsoever.

DETAILED DESCRIPTION

Mitochondria are dynamic organelles forming networks of interconnected tubules, which maintain their homeostasis by constantly fusing and dividing. Fragmented mitochondria are associated with aerobic glycolysis and susceptible to apoptotic cell death. OPA1 is an essential fusion protein, which is deactivated by the OMA1 protease under conditions of cell stress. OMA1 activation and OPA1 cleavage correlate with apoptotic signaling and programmed cell death.

We identified a series of compounds disclosed herein that surprisingly induced OMA1 activation under mild stress conditions that normally would not result in OPA1 cleavage. The compounds may find use as drugs for the treatment of conditions linked to OMA1 and/or OPA1. The following are definitions of terms used in this specification and appended claims.

References in the specification to an "aspect", "one embodiment", "an embodiment", "an example embodiment," etc., indicate that the aspect described may include a particular feature, structure, or characteristic, but every aspect may not necessarily include that particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other embodiments whether or not explicitly described.

The singular forms "a", "an", and "the" as used herein and in the claims include plural reference unless the context dictates otherwise. For example, "a cell" means as well a plurality of cells, and so forth. The term "and/or" as used in the present specification and in the claims implies that the phrases before and after this term are to be considered either as alternatives or in combination.

The terms "agent", "reagent", "modulator", "compound", "molecule" and the like refer to any substance, chemical, composition or extract that have a positive or negative biological effect on a cell, tissue, body fluid, or within the context of any biological system, or any assay system.

The meaning of the terms "OMA1" and "OPA1" is well known in the art and is, if not explicitly prescribed differentially, used accordingly in context of the present invention. In context of this invention, these terms are likewise used to refer to the corresponding nucleotide sequences (e.g. the genes) as well as to the corresponding polypeptides (e.g. the polypeptides encoded by said genes). It is to be understood that these terms are defined as broad as possible and shall include all natural and non-natural variants thereof from any and every species.

Figure 1:
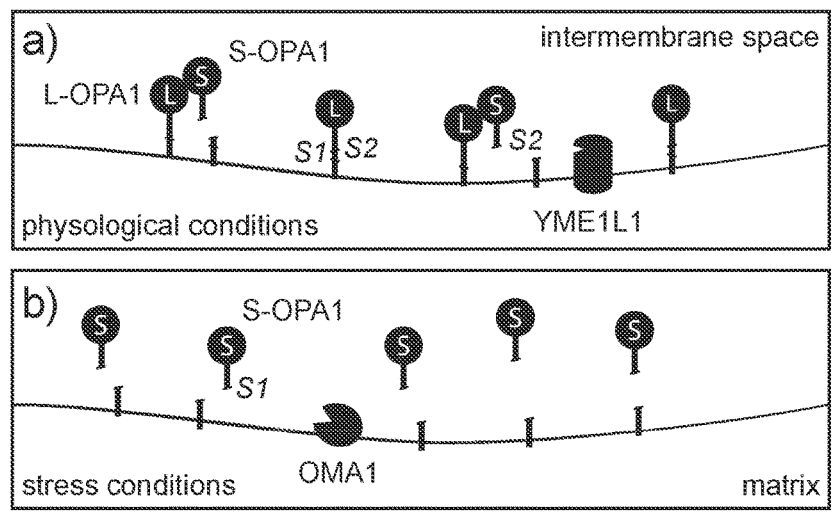
FIG. 1. A: The YME1L1 protease regulates the OPA1 ratios under physiological conditions (a). The OMA1 protease converts all OPA1 isoforms to S-OPA1 under conditions broadly defined as stress conditions (b). B: Treatment of 293T cells with 10 µM CCCP resulted in L-OPA1 cleavage clearly recognizable in OPA1 Western blots. OMA1 knock-down could prevent OPA1 hydrolyses in these experiments. C: Quantification of OMA1 protein levels in Western blots upon OMA1 knock-down (mean±S.D.; p≤0.05; n=3). D: Different chemicals and combinations of chemicals altered the OPA1 ratios in 293T cells. E: Neuro2A cells were treated with the indicated agents for 30 minutes or 3 hours, respectively. MMP2/9 Inh.: 30 µM MMP2/9 inhibitor IV; Tem.: 300 µM temozolomide; Amo.: 100 µM amoxapine; Sor.: 100 µM sorafenib; Tsa.: 100 µM trichostatin A; Vmc.: 1 µM valinomycin.
Figure 1:
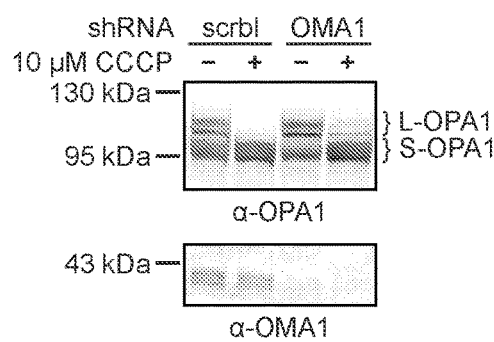
Figure 1:
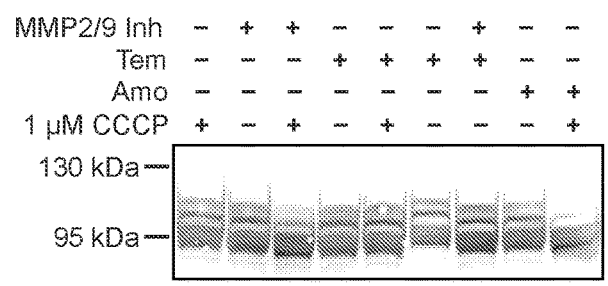
Figure 1:
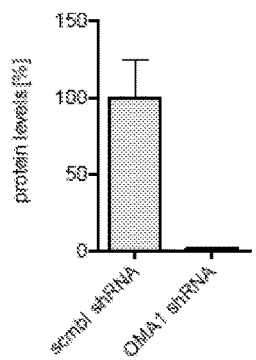
Figure 1:
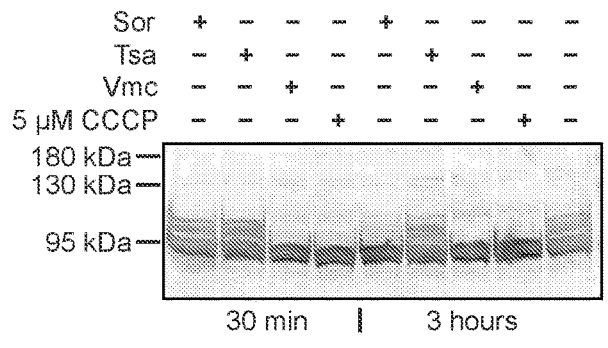
Figure 2:
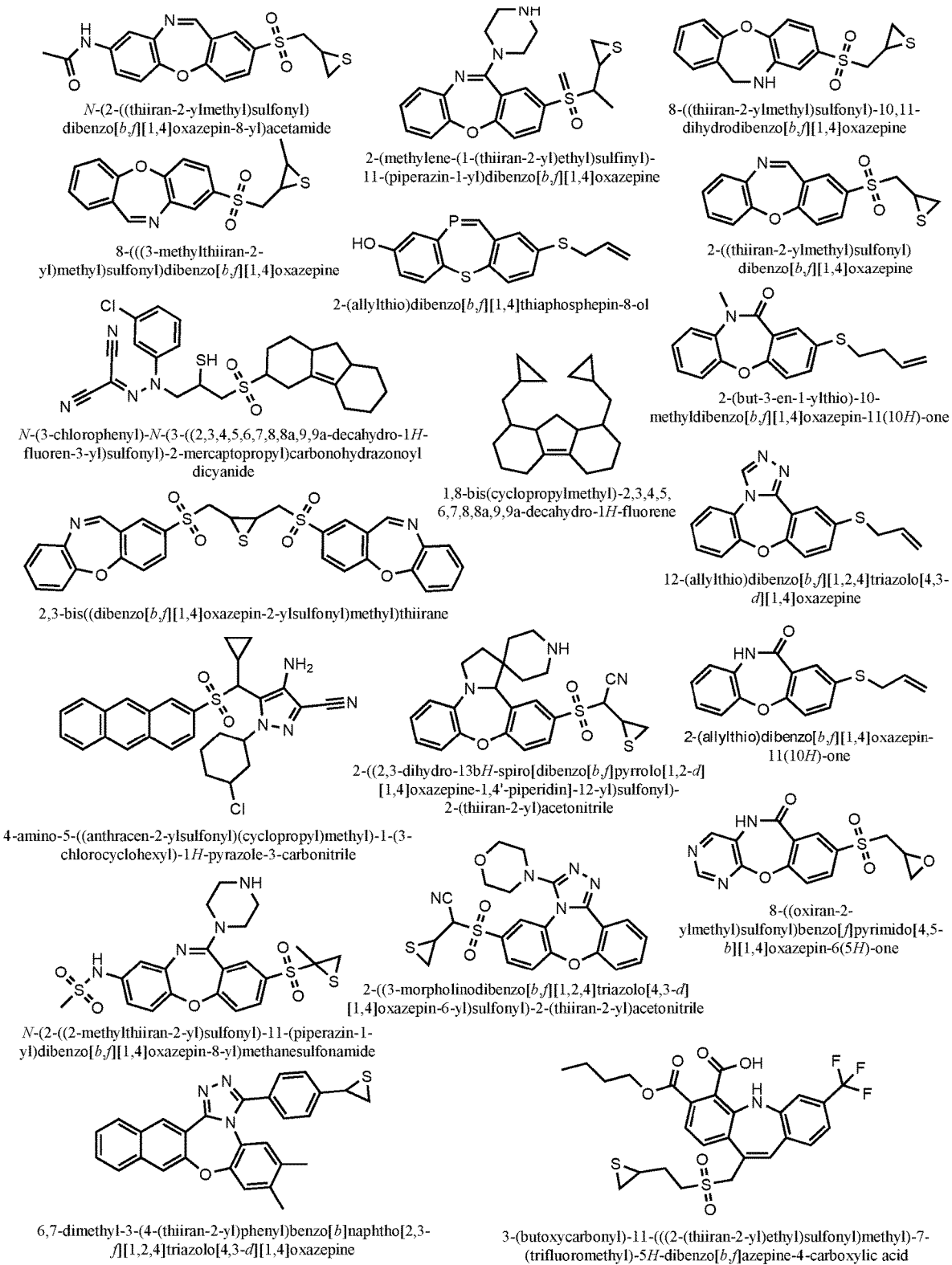
FIG. 2 shows the compounds of Aspect 19 of present invention.
Figure 3:
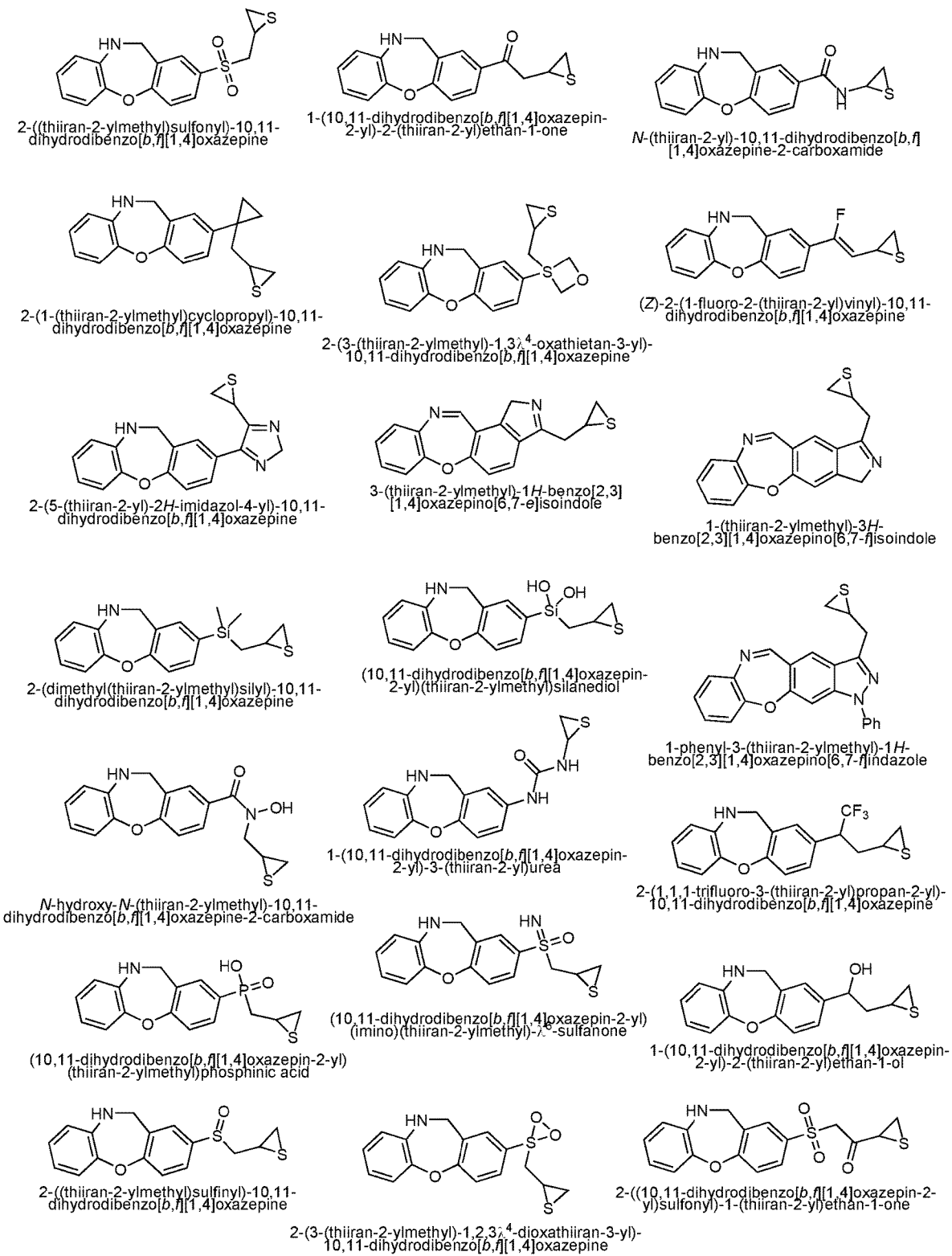
FIG. 3 shows the compounds of Aspect 20 of present invention.
Figure 4:
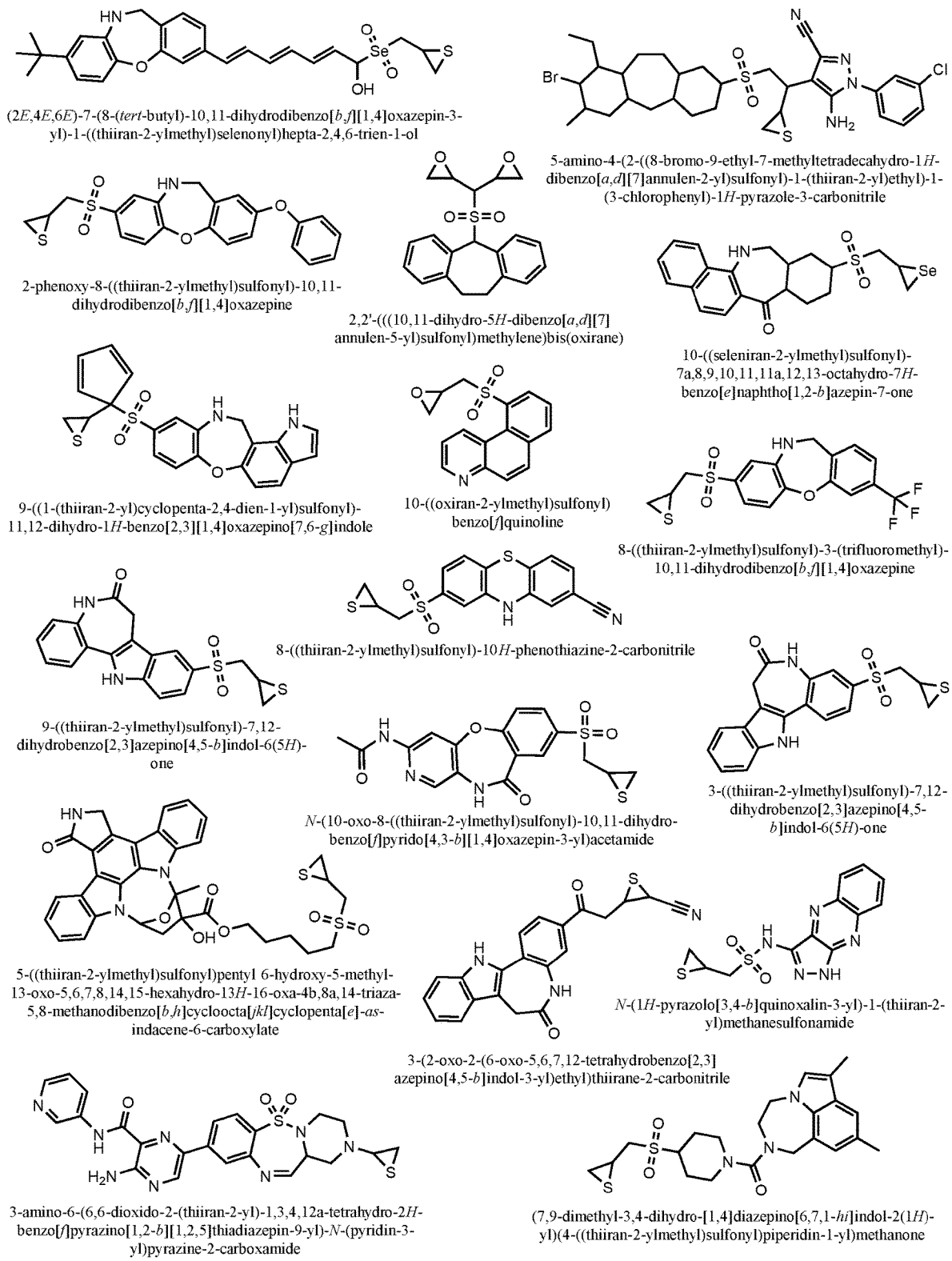
FIG. 4 shows the compounds of Aspect 21 of present invention.
Figure 5:
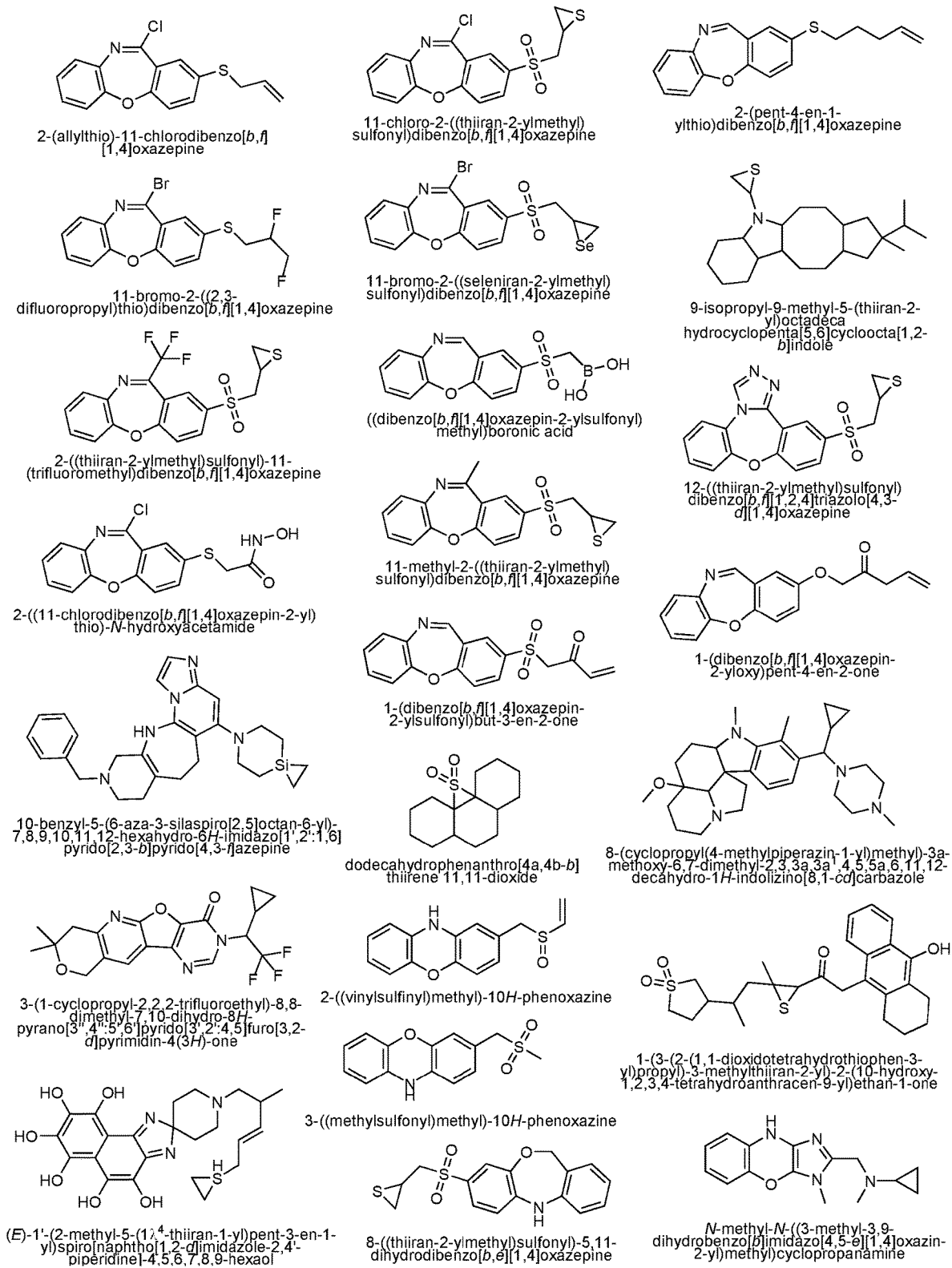
FIG. 5 shows the compounds of Aspect 22 of present invention.

As shown herein and in the arts, mitochondrial dysfunction (or a corresponding mitochondrial disease or disorder) is not merely correlated with decrease of any one of OPA1 isoforms, but with a decrease of particularly the large isoforms. Referring to FIG. 1, the large isoforms of OPA1 (L-OPA1) may comprise two isoforms and the small isoforms of OPA1 (S-OPA1) may comprise three isoforms. However, it is also within the context of the present invention that additional, possibly existing OPA1 isoforms may be assigned as large or small isoforms.

In this context, it is to be understood that the OPA1 isoforms serve as proxy for protease activity, in particular for OMA1 protease activity. Therefore, the present invention is not limited to the modulation of OPA1 isoforms but encompasses also any and every other proxy for OMA1 activity, including other OMA1 substrates, such as DELE1, PGAM5, or PINK1. A person skilled in the art is also readily in a position to deduce (further) amino acid stretches/ peptides that are (artificial) OMA1 substrates (see, for example, U.S. Ser. No. 16/101,134.)

Conversely, compounds of present disclosure may modulate the ratio of OPA1 isoforms by direct or indirect interaction with the OMA1 protease, for example by interacting with a protein complex comprising OMA1, or by interacting with other proteases, which may cleave OPA1 and/or OMA1, such as the i-AAA protease, or by interacting with OMA1-regulating enzymes, such as the m-AAA protease or prohibitin (see also Alavi M.V. "OMA1—An integral membrane protease" *Biochim Biophys Acta Proteins Proteom.* 2020 October 29:140558.)

Clinical and/or pathological examples for conditions linked to OMA1 and OPA1 in the context of the present invention are ageing; in particular pathological and/or premature aging, age-related macular degeneration (AMD), Alzheimer's disease, amyotrophic lateral sclerosis (ALS), apoptosis, ataxia, autism, autosomal dominant optic atrophy (ADOA), Barth syndrome, (familial), bipolar disorder, cancer and other proliferative conditions, cardiomyopathy, Charcot-Marie-Tooth disease (e.g., Charcot-Marie-Tooth disease type 2a and type 4a), congenital lactic acidosis, Crohn disease, deafness, diabetes, diabetic sensory neuropathy, encephalomyopathy, endotoxemia, external ophthalmoplegia (e.g. PEO), eye diseases, Friedreich's ataxia, glaucoma, heart disease, hepatopathy (e.g. defects in SCO1), hepato-cerebral form of mtDNA depletion syndrome, hereditary sensory neuropathy, hereditary spastic paraplegia, infantile encephalopathy, infantile myopathy, infectious diseases, inflammatory diseases, ischemia-reperfusion injury/ hypoxic damage/oxidative damage, Kearns-Sayre syndrome, lactic acidosis, Leber's hereditary opticus neuropathy (LHON), Leigh's syndrome, leukodystrophy, metabolic disorders (e.g. defective glucose and fatty acid metabolism), mitochondrial neurogastrointestinal-encephalomyopathy, Mohr-Tranebjaerg-syndrome, motor neuron disorders, mtDNA depletion syndrome, multiple sclerosis (MS), myoclonus epilepsy and ragged-red fibers syndrome (MERRF), myopathy, myopathy encephalopathy lactic acidosis and stroke-like episodes (MELAS), myositis, neurodegenerative disorders, non-alcoholic fatty liver disease, obesity, ocular myopathy, optic neuropathy, optic atrophy type 1, optic atrophy types 2 to 11, paraganglioma (e.g. defects in complex II/SDH), Parkinson's disease, Pearson's syndrome, respiratory chain disorder, rhabdomyolysis, schizophrenia, sideroblastic anemia, stroke, tubulopathy (e.g. defects in BCS 1L), viral and bacterial infections, Wolf-Hirschhorn syndrome, and Wolfram syndrome, among others.

Based on the teachings provided herein, it is clear that compounds of present invention are useful for the regulation of cellular processes that rely on mitochondria. For example, motility of male sperm cells is dependent on mitochondria and in one particular embodiment compounds of present invention can regulate contraception by intervening with the mitochondria of the gametes.

However, the aforementioned conditions, disorders or diseases are mere examples to be covered by the present invention, which is not strictly construed to a clinical and/or pathological situation.

The definition provided for a group or term herein applies to that group or term throughout the specification and claims, individually or as part of another group, unless otherwise indicated.

As used herein, the term "alkyl" or "alkylene" is intended to include both branched and straight-chain saturated aliphatic hydrocarbon groups having the specified number of carbon atoms. For example, "$C_{1-10}$ alkyl" (or alkylene), is intended to include $C_1$, $C_2$, $C_3$, $C_4$, $C_5$, $C_6$, $C_7$, $C_8$, $C_9$, and $C_{10}$ alkyl groups. Additionally, for example, "$C_1$-$C_6$ alkyl" denotes alkyl having 1 to 6 carbon atoms. Alkyl groups can be unsubstituted or substituted so that one or more of its hydrogens are replaced by another chemical group. Example alkyl groups include, but are not limited to, methyl, ethyl, propyl (e.g., n-propyl and isopropyl), butyl (e.g., n-butyl, isobutyl, t-butyl), pentyl (e.g., n-pentyl, isopentyl, neopentyl), and the like.

"Haloalkyl" is intended to include both branched and straight-chain saturated aliphatic hydrocarbon groups having the specified number of carbon atoms, substituted with 1 or more halogen. Examples of haloalkyl include, but are not limited to, fluoromethyl, difluoromethyl, trifluoromethyl, trichloromethyl, pentafluoroethyl, pentachloroethyl, 2,2,2-trifluoroethyl, heptafluoropropyl, and heptachloropropyl. Examples of haloalkyl also include "fluoroalkyl" which is intended to include both branched and straight-chain saturated aliphatic hydrocarbon groups having the specified number of carbon atoms, substituted with 1 or more fluorine atoms.

The term "halogen" or "halo" refers to fluorine (F), chlorine (Cl), bromine (Br) and iodine (I).

"Haloalkoxy" or "haloalkyloxy" represents a haloalkyl group as defined above with the indicated number of carbon atoms attached through an oxygen bridge. For example, "$C_{1-6}$ haloalkoxy", is intended to include $C_1$, $C_2$, $C_3$, $C_4$, $C_5$, and $C_6$ haloalkoxy groups. Examples of haloalkoxy include, but are not limited to, trifluoromethoxy, 2,2,2-trifluoroethoxy, pentafluorothoxy, and the like. Similarly, "haloalkylthio" or "thiohaloalkoxy" represents a haloalkyl group as defined above with the indicated number of carbon atoms attached through a sulphur bridge; for example trifluoromethyl-S—, pentafluoroethyl-S—, and the like.

As used herein, "carbocycle," "carbocyclic residue," or "carbocyclyl" is intended to mean any stable 3-, 4-, 5-, 6-, or 7-membered monocyclic or bicyclic or 7-, 8-, 9-, 10-, 11-, 12-, or 13-membered bicyclic or tricyclic hydrocarbon ring, any of which may be saturated, partially unsaturated, unsaturated or aromatic. Examples of such carbocycles include, but are not limited to, cyclopropyl, cyclobutyl, cyclobutenyl, cyclopentyl, cyclopentenyl, cyclohexyl, cycloheptenyl, cycloheptyl, cycloheptenyl, adamantyl, cyclooctyl, cyclooctenyl, cyclooctadienyl, [3.3.0]bicyclooctane, [4.3.0]bicyclononane, [4.4.0]bicyclodecane, [2.2.2]bicyclooctane, fluorenyl, phenyl, naphthyl, indanyl, adamantyl, anthracenyl, and tetrahydronaphthyl (tetralin). As shown above, bridged rings are also included in the definition of carbocycle (e.g., [2.2.2]bicyclooctane). Preferred carbocycles, unless otherwise specified, are cyclopropyl, cyclobutyl, cyclopentyl, cyclohexyl, phenyl, and indanyl. When the term "carbocycle," "carbocyclic residue," or "carbocyclyl" is used, it is intended to include "aryl". A bridged ring occurs when one or more carbon atoms link two non-adjacent carbon atoms. Preferred bridges are one or two carbon atoms. It is noted that a bridge always converts a monocyclic ring into a tricyclic ring. When a ring is bridged, the substituents recited for the ring may also be present on the bridge.

The term "aryl" refers to monocyclic, bicyclic, tricyclic aromatic hydrocarbon groups having 6 to 15 carbon atoms in the ring portion, such as phenyl, naphthyl, biphenyl and diphenyl groups, each of which may be substituted. Aryl groups which be bicyclic or tricyclic must include at least one fully aromatic ring but the other fused ring or rings may be aromatic or non-aromatic. When an aryl is substituted with a further heterocyclic ring, said ring may be attached to the aryl through a carbon atom or a heteroatom and said ring in turn is optionally substituted as valence allows.

The terms "aryloxy", "arylamino", "arylalkylamino", "arylthio", "arylalkanoylamino", "arylsulfonyl", "arylalkoxy", "arylsulfinyl", "arylheteroaryl", "arylalkylthio", "arylcarbonyl", "arylalkenyl", or "arylalkylsulfonyl" refer to an aryl or substituted aryl bonded to an oxygen; an amino; an alkylamino; a thio; an alkanoylamino; a sulfonyl; an alkoxy; a sulfinyl; a heteroaryl or substituted heteroaryl; an alkylthio; a carbonyl; an alkenyl; or an alkylsulfonyl, respectively.

The term "alkenyl" refers to straight or branched chain hydrocarbon groups of 2 to 20 carbon atoms, preferably 2 to 15 carbon atoms, and most preferably 2 to 8 carbon atoms, having one or more double bonds. Alkeyl groups can be unsubstituted or substituted so that one or more of its hydrogens are replaced by another chemical group. In certain embodiments of the invention a carbon is replaced with another atom or group. In one embodiment, C4 of 1-butene is replaced with a sulfur, resulting in a sulfane or propenethiol.

The term "alkynyl" refers to straight or branched chain hydrocarbon groups of 2 to 20 carbon atoms, preferably 2 to 15 carbon atoms, and most preferably 2 to 8 carbon atoms, having one or more triple bonds.

An "alkylidene" group refers to an alkylene group consisting of at least two carbon atoms and at least one carbon-carbon double bond. Substituents on this group include those in the definition of "substituted alkyl".

The term "cycloalkyl" refers to an optionally substituted, saturated cyclic hydrocarbon ring systems, preferably containing 1 to 3 rings and 3 to 7 carbons per ring. Exemplary groups include cyclopropyl, cyclobutyl, cyclopentyl, cyclohexyl, cycloheptyl, cyclooctyl, cyclodecyl, cyclododecyl, and adamantyl. Exemplary substituents include one or more alkyl groups as described above, or one or more groups described above as alkyl substituents.

As used herein, the term "heterocycle," "heterocyclyl," "heterocyclic ring" or "heterocyclic group" is intended to mean a stable 4-, 5-, 6-, or 7-membered monocyclic or bicyclic or 7-, 8-, 9-, 10-, 11-, 12-, 13-, or 14-membered bicyclic heterocyclic ring which is saturated, partially unsaturated or fully unsaturated or aromatic, and which consists of carbon atoms and 1, 2, 3 or 4 heteroatoms independently selected from the group consisting of N, O and S; and including any bicyclic group in which any of the above-defined heterocyclic rings is fused to a benzene ring. The nitrogen and sulfur heteroatoms may optionally be oxidized (i.e., N→O and $S(O)_p$). The nitrogen atom may be substituted or unsubstituted (i.e., N or NR wherein R is H or another substituent, if defined). The heterocyclic ring may be attached to its pendant group at any heteroatom or carbon atom that results in a stable structure. The heterocyclic rings described herein may be substituted on carbon or on a nitrogen atom if the resulting compound is stable. A nitrogen in the heterocycle may optionally be quaternized. It is preferred that when the total number of S and O atoms in the heterocycle exceeds 1, then these heteroatoms are not adjacent to one another. It is preferred that the total number of S and O atoms in the heterocycle is not more than 1. When the term "heterocycle," "heterocyclyl," "heterocyclic ring" or "heterocyclic group" is used, it is intended to include heteroaryl.

Examples of heterocycles include, but are not limited to, acridinyl, azocinyl, benzimidazolyl, benzofuranyl, benzothiofuranyl, benzoxazolyl, benzoxazolinyl, benzthiazolyl, benztriazolyl, benztetrazolyl, benzisoxazolyl, benzisothiazolyl, benzimidazolinyl, carbazolyl, 4aH-carbazolyl, carbolinyl, chromanyl, chromenyl, cinnolinyl, decahydroquinolinyl, 2H,6H-1,5,2-dithiazinyl, dihydrofuro[2,3-b]tetrahydrofuran, furanyl, furazanyl, imidazolidinyl, imidazolinyl, imidazolyl, 1H-indazolyl, indolenyl, indolinyl, indolizinyl, indolyl, 3H-indolyl, isatinoyl, isobenzofuranyl, isochromanyl, isoindazolyl, isoindolinyl, isoindolyl, isoquinolinyl, isothiazolyl, isothiazolopyridinyl, isoxazolyl, isoxazolopyridinyl, methylenedioxyphenyl, morpholinyl, naphthyridinyl, octahydroisoquinolinyl, oxadiazolyl, 1,2,3-oxadiazolyl, 1,2,4-oxadiazolyl, 1,2,5-oxadiazolyl, 1,3,4-oxadiazolyl, oxazolidinyl, oxazolyl, oxindolyl, pyrimidinyl, phenanthridinyl, phenanthrolinyl, phenazinyl, phenothiazinyl, phenoxathinyl, phenoxazinyl, phthalazinyl, piperazinyl, piperidinyl, piperidonyl, 4-piperidonyl, piperonyl, pteridinyl, purinyl, pyranyl, pyrazinyl, pyrazolidinyl, pyrazolinyl, pyrazolyl, pyridazinyl, pyridooxazole, pyridoimidazole, pyridothiazole, pyridinyl, pyrimidinyl, pyrrolidinyl, pyrrolinyl, 2-pyrrolidonyl, 2H-pyrrolyl, pyrrolyl, quinazolinyl, quinolinyl, 4H-quinolizinyl, quinoxalinyl, quinuclidinyl, tetrahydrofuranyl, tetrahydroisoquinolinyl, tetrahydroquinolinyl, tetrazolyl, 6H-1,2,5-thiadiazinyl, 1,2,3-thiadiazolyl, 1,2,4-thiadiazolyl, 1,2,5-thiadiazolyl, 1,3,4-thiadiazolyl, thianthrenyl, thiazolyl, thienyl, thienothiazolyl, thienooxazolyl, thienoimidazolyl, thiophenyl, triazinyl, 1,2,3-triazolyl, 1,2,4-triazolyl, 1,2,5-triazolyl, 1,3,4-triazolyl, and xanthenyl. Also included are fused ring and spiro compounds containing, for example, the above heterocycles.

Preferred 5- to 10-membered heterocycles include, but are not limited to, pyridinyl, furanyl, thienyl, pyrrolyl, pyrazolyl, pyrazinyl, piperazinyl, piperidinyl, imidazolyl, imidazolidinyl, indolyl, tetrazolyl, isoxazolyl, morpholinyl, oxazolyl, oxadiazolyl, oxazolidinyl, tetrahydrofuranyl, thiadiazinyl, thiadiazolyl, thiazolyl, triazinyl, triazolyl, benzimidazolyl, 1H-indazolyl, benzofuranyl, benzothiofuranyl, benztetrazolyl, benzotriazolyl, benzisoxazolyl, benzoxazolyl, oxindolyl, benzoxazolinyl, benzthiazolyl, benzisothiazolyl, isatinoyl, isoquinolinyl, octahydroisoquinolinyl, tetrahydroisoquinolinyl, tetrahydroquinolinyl, isoxazolopyridinyl, quinazolinyl, quinolinyl, isothiazolopyridinyl, thiazolopyridinyl, oxazolopyridinyl, imidazolopyridinyl, and pyrazolopyridinyl.

Preferred 5- to 6-membered heterocycles include, but are not limited to, pyridinyl, furanyl, thienyl, pyrrolyl, pyrazolyl, pyrazinyl, piperazinyl, piperidinyl, imidazolyl, imidazolidinyl, indolyl, tetrazolyl, isoxazolyl, morpholinyl, oxazolyl, oxadiazolyl, oxazolidinyl, tetrahydrofuranyl, thiadiazinyl, thiadiazolyl, thiazolyl, triazinyl, and triazolyl. Also included are fused ring and spiro compounds containing, for example, the above heterocycles.

Bridged rings are also included in the definition of heterocycle. A bridged ring occurs when one or more atoms (i.e., C, O, N, or S) link two non-adjacent carbon or nitrogen atoms. Preferred bridges include, but are not limited to, one carbon atom, two carbon atoms, one nitrogen atom, two nitrogen atoms, and a carbon-nitrogen group.

When a ring is bridged, the substituents recited for the ring may also be present on the bridge.

The term "heteroaryl" refers to substituted and unsubstituted aromatic 5- or 6-membered monocyclic groups, 9- or 10-membered bicyclic groups, and 11- to 14-membered tricyclic groups which have at least one heteroatom (O, S or N) in at least one of the rings, said heteroatom-containing ring preferably having 1, 2, or 3 heteroatoms selected from the group consisting of O, S, and N. Each ring of the heteroaryl group containing a heteroatom can contain one or two oxygen or sulfur atoms and/or from one to four nitrogen atoms provided that the total number of heteroatoms in each ring is four or less and each ring has at least one carbon atom.

Heteroaryl groups can be substituted or unsubstituted. The nitrogen atom may be substituted or unsubstituted (i.e., N or NR wherein R is H or another substituent, if defined). The nitrogen and sulfur heteroatoms may be oxidized (i.e., N→O and $S(O)_p$) and the nitrogen atoms may be quaternized.

Heteroaryl groups which are bicyclic or tricyclic must include at least one fully aromatic ring but the other fused ring or rings may be aromatic or non-aromatic. The heteroaryl group may be attached at any available nitrogen or carbon atom of any ring. The heteroaryl ring system may contain zero, one, two or three substituents.

Exemplary monocyclic heteroaryl groups include pyrrolyl, pyrazolyl, pyrazolinyl, imidazolyl, oxazolyl, isoxazolyl, thiazolyl, thiadiazolyl, isothiazolyl, furanyl, thienyl, oxadiazolyl, pyridyl, pyrazinyl, pyrimidinyl, pyridazinyl, triazinyl, and the like.

Exemplary bicyclic heteroaryl groups include indolyl, benzothiazolyl, benzodioxolyl, benzoxazolyl, benzothienyl, quinolinyl, dihydroisoquinolinyl, tetrahydroquinolinyl, isoquinolinyl, benzimidazolyl, benzopyranyl, benzoxazinyl, indolizinyl, benzofuranyl, chromonyl, coumarinyl, benzopyranyl, cinnolinyl, quinoxalinyl, indazolyl, pyrrolopyridyl, furopyridyl, dihydroisoindolyl, and the like.

Exemplary tricyclic heteroaryl groups include carbazolyl, benzidolyl, phenanthrollinyl, acridinyl, phenanthridinyl, xanthenyl and the like.

The term "heteroatoms" shall include oxygen, sulfur and nitrogen.

As referred to herein, the term "substituted" means that one or more hydrogen atoms is replaced with a non-hydrogen group, provided that normal valencies are maintained and that the substitution results in a stable compound. When a substituent is keto (i.e., =O), then 2 hydrogens on the atom are replaced. Keto substituents are not present on aromatic moieties. When a ring system (e.g., carbocyclic or heterocyclic) is said to be substituted with a carbonyl group or a double bond, it is intended that the carbonyl group or double bond be part (i.e., within) of the ring. Ring double bonds, as used herein, are double bonds that are formed between two adjacent ring atoms (e.g., C=C, C=N, or N=N).

In cases wherein there are nitrogen atoms (e g , amines) on compounds of the present invention, these may be converted to N-oxides by treatment with an oxidizing agent (e.g., mCPBA and/or hydrogen peroxides) to afford other compounds of this invention. Thus, shown and claimed nitrogen atoms are considered to cover both the shown nitrogen and its N-oxide (N→O) derivative.

When any variable occurs more than one time in any constituent or formula for a compound, its definition at each occurrence is independent of its definition at every other occurrence. Thus, for example, if a group is shown to be substituted with 1-3 $R_e$, then said group may optionally be substituted with up to three $R_e$ groups and $R_e$ at each occurrence is selected independently from the definition of $R_e$. Also, combinations of substituents and/or variables are permissible.

When a dotted ring is used within a ring structure, this indicates that the ring structure may be saturated, partially saturated or unsaturated.

The term "stereochemically isomeric forms" as used herein defines all the possible isomeric forms which the compounds may possess. Unless otherwise mentioned, the chemical designation of compounds denotes the mixture of all possible stereochemically isomeric forms, said mixtures containing all diastereomers and enantiomers of the basic molecular structure. More in particular, stereogenic centers may have the R- or S-configuration; substituents on bivalent cyclic (partially) saturated radicals may have either the cis- or trans-configuration. Stereochemically isomeric forms of the disclosed compounds are obviously intended to be embraced within the scope of this invention.

The absolute stereochemical configuration of the compounds of present invention and of the intermediates used in their preparation may easily be determined by those skilled in the art while using well-known methods such as, for example, X-ray diffraction.

In certain embodiments the compounds of present invention can be combined with other therapies and treatments. For example in the field of medical oncology it is normal practice to use a combination of different forms of treatment to treat each patient with cancer. In these particular embodiments the other component(s) of such treatment in addition to the OMA1 activating and/or OPA1-hydrolisis-inducing treatment defined herein may be surgery, radiotherapy, immunomodulatory treatment, chemotherapy, or another anti-cancer agent.

In some embodiments of present invention such chemotherapy may be selected from one or more of three main categories of therapeutic agent:

i) antiangiogenic agents that work by different mechanisms from those defined herein before (for example, linomide, inhibitors of integrin αvβ3 function, angiostatin, razoxane);

ii) cytostatic agents such as antiestrogens (for example, tamoxifen, toremifene, raloxifene, droloxifene, iodoxifene), progestogens (for example, megestrol acetate), aromatase inhibitors (for example, anastrozole, letrozole, borazole, exemestane), antihormones, antiprogestogens, antiandrogens (for example, flutamide, nilutamide, bicalutamide, cyproterone acetate), LHRH agonists and antagonists (for example, goserelin acetate, leuprolide), inhibitors of testosterone 5α-dihydroreductase (for example, finasteride), farnesyltransferase inhibitors, anti-invasion agents (for example, metalloproteinase inhibitors such as marimastat and inhibitors of urokinase plasminogen activator receptor function) and inhibitors of growth factor function, (such growth factors include for example, EGF, FGF, platelet derived growth factor and hepatocyte growth factor, such inhibitors include growth factor antibodies, growth factor receptor antibodies such as AVASTIN® (bevacizumab) and ERBITUX® (cetuximab); tyrosine kinase inhibitors and serine/threonine kinase inhibitors); and iii) antiproliferative/antineoplastic drugs and combinations thereof, as used in medical oncology, such as antimetabolites (for example, antifolates such as methotrexate, fluoropyrimidines such as 5-fluorouracil, purine and adenosine analogues, cytosine arabinoside); intercalating antitumour antibiotics (for example, anthracyclines such as doxorubicin, daunomycin, epirubicin and idarubicin, mitomycin-C, dactinomycin, mithramycin); platinum derivatives (for example, cisplatin, carboplatin); alkylating agents (for example, nitrogen mustard, melphalan, chlorambucil, busulphan, cyclophosphamide, ifosfamide, nitrosoureas, thiotepa; antimitotic agents (for example, vinca alkaloids like vincristine, vinorelbine, vinblastine and vinflunine) and taxoids such as TAXOL® (paclitaxel), Taxotere (docetaxel) and newer microbtubule agents such as epothilone analogs (ixabepilone), discodermolide analogs, and eleutherobin analogs; topoisomerase inhibitors (for example, epipodophyllotoxins such as etoposide and teniposide, amsacrine, topotecan, irinotecan); cell cycle inhibitors (for example, flavopyridols); biological response modifiers and proteasome inhibitors such as VELCADE® (bortezomib).

The term "anti-cancer agent", "cancer drug" and the like includes any known agent that is useful for the treatment of cancer including the following: 17α-ethinylestradiol, diethylstilbestrol, testosterone, prednisone, fluoxymesterone, dromostanolone propionate, testolactone, megestrolacetate, methylprednisolone, methyl-testosterone, prednisolone, triamcinolone, chlorotrianisene, hydroxyprogesterone, aminoglutethimide, estramustine, medroxyprogesteroneacetate, leuprolide, flutamide, toremifene, ZOLADEX®; matrix metalloproteinase inhibitors; VEGF inhibitors, such as anti-VEGF antibodies (AVASTIN®) and small molecules such as ZD6474 and SU6668; Vatalanib, BAY-43-9006, SU11248, CP-547632, and CEP-7055; HER 1 and HER 2 inhibitors including anti-HER2 antibodies (HERCEPTIN®); EGFR inhibitors including gefitinib, erlotinib, ABX-EGF, EMD72000, 11F8, and cetuximab; Eg5 inhibitors, such as SB-715992, SB-743921, and MKI-833; pan Her inhibitors, such as canertinib, EKB-569, CI-1033, AEE-788, XL-647, mAb 2C4, and GW-572016; Src inhibitors, e.g., GLEEVEC® and dasatinib; CASODEX® (bicalutamide, Astra Zeneca), Tamoxifen; MEK-1 kinase inhibitors, MAPK kinase inhibitors, PI3 kinase inhibitors; PDGF inhibitors, such as imatinib; anti-angiogenic and antivascular agents which, by interrupting blood flow to solid tumors, render cancer cells quiescent by depriving them of nutrition; castration, which renders androgen dependent carcinomas non-proliferative; inhibitors of non-receptor and receptor tyrosine kinases; inhibitors of integrin signaling; tubulin acting agents such as vinblastine, vincristine, vinorelbine, vinflunine, paclitaxel, docetaxel, 7-O-methylthiomethylpaclitaxel, 4-desacetyl-4-methylcarbonatepaclitaxel, 3'-tert-butyl-3'-N-tert-butyloxycarbonyl-4-deacetyl-3'-dephenyl-3'-N-debenzoyl-4-O-methoxycarbonyl-paclitaxel, C-4 methyl carbonate paclitaxel, epothilone A, epothilone B, epothilone C, epothilone D, [1S-[1R*,3R*(E),7R*,10S*,11R*,12R*,16S*]]-7-11-dihydroxy-8,8,10,12,16-pentamethyl-3-[1-methyl-2-(2-methyl-4-thiazoly)ethenyl]-4-aza-17 oxabicyclo [14.1.0]heptadecane-5,9-dione (ixabepilone), [1S-[1R*,3R*(E),7R*,10S*,11R*,12R*,16S*]]-3-[2-[2-(aminomethyl)-4-thiazolyl]-1-methylethenyl]-7,11-dihydroxy-8,8,10,12,16-pentamethyl-4-17-dioxabicyclo [14.1.0]-heptadecane-5,9-dione, and derivatives thereof; other CDK inhibitors, antiproliferative cell cycle inhibitors, epidophyllotoxin, etoposide, VM-26; antineoplastic enzymes, e.g., topoisomerase I inhibitors, camptothecin, topotecan, SN-38; procarbazine; mitoxantrone; platinum coordination complexes such as cisplatin, carboplatin and oxaliplatin; temozolomide; biological response modifiers; growth inhibitors; antihormonal therapeutic agents; leucovorin; tegafur; antimetabolites such as purine antagonists (e.g., 6-thioguanine and 6-mercaptopurine; glutamine antagonists, e.g., DON (AT-125; d-oxo-norleucine); ribonucleotide reductase inhibitors; mTOR inhibitors; and haematopoietic growth factors.

Additional aspects of the invention cover cytotoxic agents, which include cyclophosphamide, doxorubicin, daunorubicin, mitoxantrone, melphalan, hexamethyl melamine, thiotepa, cytarabin, idatrexate, trimetrexate, dacarbazine, L-asparaginase, bicalutamide, leuprolide, pyridobenzoindole derivatives, interferons, and interleukins.

In other embodiments of present invention such cancer drug is an immunomodulatory compound. The term "immune-modulatory compound," "immunomodulatory treatment", "immunomodulator" and the like as used herein, refers to an agent that increases or enhances an immune response in the body (e.g., anti-tumor immune response). Exemplary immunomodulatory compounds of the present disclosure include antibodies, such as an anti-CTLA-4 antibody, anti-PD-1 antibody, an anti-PD-L1 antibody, and fragments thereof.

In certain embodiments, the present pharmaceutical combinations comprise an immunomodulatory compound that is an immune checkpoint inhibitor or an immune checkpoint stimulator. In some embodiments, the immune checkpoint inhibitor or the immune checkpoint stimulator is an antibody.

In such embodiments, the immune checkpoint inhibitor may be an antibody, such as antibodies selected from anti-CTLA-4 antibodies, anti-PD-1 antibodies, and anti-PD-L1 antibodies. In other embodiments, the immunomodulatory compound is an immune checkpoint inhibitor that is an antibody selected from anti-KIR antibodies (such as Lirilumab by Innate Pharma & BMS), anti-BTLA antibodies, anti-HVEM antibodies, anti-LAG3 antibodies (such as BMS-986016 by BMS), anti-TIM3 antibodies, and anti-NKG2A antibodies (such as monalizumab by Innate Pharma).

In certain embodiments, the immunomodulatory compound is an immune checkpoint inhibitor that is an anti-CTLA-4 anti-body, such as ipilimumab (BMS/Yervoy®) or tremelimumab (Pfizer). In other embodiments, the ICI is an anti-PD-1 antibody, such as lambrolizumab-pembrolizumab (Merck/Keytruda®) or nivolumab (BMS/Opdivo®). In further embodiments, the immune checkpoint inhibitor is an anti-PD-L1 antibody, such as avelumab (Merck), durvalumab (AstraZeneca), BMS-936559 (BMS), or atezolizumab MPDL3280A (Roche).

The term "anti-CTLA-4 antibody," as used herein, refers to an antibody that selectively binds a CTLA-4 polypeptide. Exemplary anti-CTLA-4 antibodies are described for example in U.S. Pat. Nos. 6,682,736; 7,109,003; 7,123,281; 7,411,057; 7,824,679; 8,143,379; 7,807,797; and 8,491,895 which are incorporated by reference herein in their entirety. Tremelimumab is an exemplary anti-CTLA-4 antibody.

In certain embodiments, the immunomodulatory compound is an immune checkpoint stimulator. In such embodiments, the immune checkpoint stimulator may be an antibody, such as an agonistic antibody directed against stimulatory checkpoint molecules. In some embodiments, the immune checkpoint stimulator is an antibody selected from anti-CD40 agonist antibodies (e.g. CP-870,893; Pfizer and VLST), dacetuzumab (Seattle Genetics), Chi Lob 7/4 (University of Southampton) and lucatumumab (Novartis), anti-ICOS agonist antibodies, and anti-OX40 agonist antibodies (e.g. MEDI6469; MedImmune).

In some embodiments, the present pharmaceutical combinations comprise one or more antibodies. For instance, in certain embodiments, the pharmaceutical combinations comprise the pharmaceutical combinations comprise two or more immune checkpoint inhibitors (ICI) (such as a CTLA-4 antibody and an anti-PD-1 antibody). In other embodiments, the pharmaceutical combinations comprise an immune checkpoint inhibitor (ICI) and an immune checkpoint stimulator (ICS) (such as an anti-PD-1 antibody and an anti-CD40 agonist antibody).

In other embodiments of present invention, OMA1 activating agents and/or OPA1-hydrolisis inducing agents may be combined with neuroprotective treatments. It is well-established in the arts that OPA1 alterations can lead to a neurodegenerative disease mainly affecting the optic nerve in individuals with autosomal dominant optic atrophy (see, for example, Alavi MV & Fuhrmann N. "Dominant optic atrophy, OPA1, and mitochondrial quality control: understanding mitochondrial network dynamics." *Mol Neurodegener.* 2013 Sep. 25; 8:32.) OPA1 alterations are also a feature of Parkinson's disease and Alzheimer's disease (see U.S. Ser. No. 16/022,481, and references therein). In one particular embodiment of present invention, a compound of present disclosure is combined with an OMA1 antagonist (for example an OMA1 inhibitor, an OMA1 antisense drug, or an OMA1 gene-therapy as known to a person having skills in the art, see, inter alia, U.S. Ser. No. 16/022,481). In another embodiment of present invention, such OMA1 antagonist may be administered locally to the optic nerve, while the patient is treated systemically with compounds of present disclosure.

The skilled artisan certainly understands the gist of the invention and is readily enabled to identify and implement additional combinations, which are all within the scope of the invention.

As used herein, the terms "treating" or "treatment" or the like encompass either or both responsive and prophylaxis measures, e.g., measures designed to inhibit or delay the onset of the disease or disorder, achieve a full or partial reduction of the symptoms or disease state, and/or to alleviate, ameliorate, lessen, or cure the disease or disorder and/or its symptoms.

Embodiments

An important aspect of the present invention is the combination of a tricyclic compound of general formula (I) with a functional group of formula (II). Representative examples of a compound of formula (I) include tricyclic compounds such as diazepines, oxazepines, thiazepines, azepines, benzoindole, phenanthrene and the like. Examples and derivates of a compound of formula (I) and other tricyclic compounds covered by present invention can be found, inter alia, in CA2916374, CA2920272, EP0696283, JP2018008914, WO/2020/063663, U.S. Pat. Nos. 3,336, 307, 1,6474,245, 3,218,326, 3,786,145, 3,887,575, 3,962, 248, 4,472,397, 5,344,828, 5,212,169, US20120178738, U.S. Pat. Nos. 1,0369,154, and 8,461,145, which are each incorporated herein by reference in their entirety.

Representative examples of the functional group of formula II include thiirane, oxirane, 3-methylsulfanylprop-1-ene, 4-methylsulfanylprop-1-ene, 2-(methylsulfonylmethyl)thiirane, 2-(methylsulfonylmethyl)oxirane, and the like. More examples and derivates of the functional group of formula II can be found, inter alia, in U.S. Pat. Nos. 8,093,287, 7,928,127, 9,321,754, 9,604,957, and 6,703,415, 5,212,169 which are each incorporated herein by reference in their entirety.

In some embodiments, a compound of present invention is provided by the following aspects.

Aspect 1. A compound of formula (I)

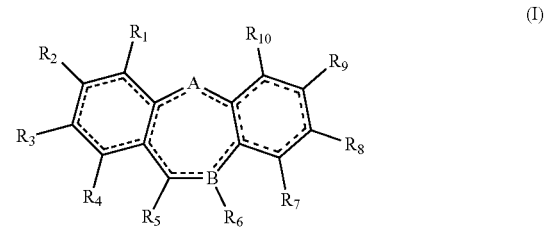

or any stereochemically isomeric form thereof, wherein A, B, and $R_1$ to $R_{10}$ represent an atom or a group
provided that at least one of $R_1$, $R_2$, $R_3$, $R_4$, $R_5$, $R_6$, $R_7$, $R_8$, $R_9$, or $R_{10}$ is a group of formula (II)

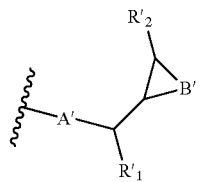

(II)

or any stereochemically isomeric form thereof, wherein
A' is a single bond, alkyl, alkylene, alkenyl, alkynyl, alkylidene, —N(H)—, —N(R'$_3$)—, —N(OH)—, —S(O)$_2$—, —S(O)—, —O—, or the like;
B' is C, N, O, P or S; and
R'$_1$, R'$_2$, and R'$_3$ represent an atom or a group; or a pharmaceutically acceptable salt thereof, or an N-oxide thereof.

Aspect 2. A compound of formula (I), wherein
A is a single bond, alkyl, alkylene, alkenyl, alkynyl, alkylidene, —N(H)—, —N(R$_{11}$)—, —N(OH)—, —S(O)$_2$—, —S(O)—, —O—, or the like;
B is C, N, O, P, or S; provided that when B represents N or O then B may or may not be substituted at $R_6$; and
$R_1$, $R_2$, $R_3$, $R_4$, $R_5$, $R_6$, $R_7$, $R_8$, $R_9$, $R_{10}$, and $R_{11}$ are each independently selected from hydrogen, halo, hydroxy, carboxy, keto, alkyl, alkylene, haloalkyl, polyhaloalkyl, haloalkoxy, carbocyclic residue, aryl, aryloxy, arylamino, arylalkylamino, arylthio, arylalkanoylamino, arylsulfonyl, arylalkoxy, arylsulfinyl, arylheteroaryl, arylalkylthio, arylcarbonyl, arylalkenyl, or arylalkylsulfonyl, alkynyl, alkenyl, alkyloxy, polyhaloalkyloxy, alkylidene, cycloalkyl, cycloalkanone, heterocyclic group, heteroaryl, —C(O)OR$_{12}$, —NR$_{13}$R$_{14}$, and —C(O)NR$_{13}$R$_{14}$, wherein NR$_{13}$R$_{14}$ may form a heterocyclic ring, or a chemical group;
provided that at least one of $R_1$, $R_2$, $R_3$, $R_4$, $R_5$, $R_6$, $R_7$, $R_8$, $R_9$, or $R_{10}$ is a sulfane or a group of formula (II), or any stereochemically isomeric form thereof, wherein
A' is a single bond, alkyl, alkylene, alkenyl, alkynyl, alkylidene, —N(H)—, —N(R'$_3$)—, —N(OH)—, —S(O)$_2$—, —S(O)—, —O—, or the like;
B' is C, N, O, P or S; and
R'$_1$, R'$_2$, and R'$_3$ represent an atom or a group;
or a pharmaceutically acceptable salt thereof, or an N-oxide thereof.

Aspect 3. A compound as claimed in Aspect 1 wherein at least one of the substituents $R_1$, $R_2$, $R_3$, $R_4$, $R_5$, $R_6$, $R_7$, $R_8$, $R_9$, and $R_{10}$ is a sulfane or the group of formula (II) wherein A' is S or O; and B' is sulfur dioxide (SO$_2$); and R'$_1$ and R'$_2$ are both hydrogens.

Aspect 4. A compound of formula (I) wherein at least one of the substituents $R_1$, $R_2$, $R_3$, $R_4$, $R_5$, $R_6$, $R_7$, $R_8$, $R_9$, and $R_{10}$ is a group of formula (III)

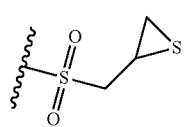

(III)

or any stereochemically isomeric form thereof, or a pharmaceutically acceptable salt thereof, or an N-oxide thereof.

Aspect 5. A compound as claimed in Aspect 1 wherein A is O; and B is N; and $R_3$ and/or $R_8$ is a sulfane or the group of formula (II) wherein A' is S or O; and B' is sulfur dioxide (SO$_2$); and R'$_1$ and R'$_2$ are both hydrogens.

Aspect 6. A compound as claimed in Aspect 1 wherein A is O; and B is N; and $R_5$ is a ketone; and $R_3$ is a sulfane; or any stereochemically isomeric form thereof.

Aspect 7. A compound as claimed in Aspect 1 wherein A is O; and B is N; and $R_5$ is a ketone; and $R_3$ is the group of formula (II) wherein A' is S or O; and B' is sulfur dioxide (SO$_2$); and R'$_1$ and R'$_2$ are both hydrogens, or any stereochemically isomeric form thereof, a pharmaceutically acceptable salt thereof, or an N-oxide thereof.

Aspect 8. A compound of formula (IV)

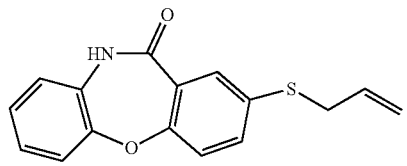

(IV)

or any stereochemically isomeric form thereof or a pharmaceutically acceptable salt thereof.

Aspect 9. A compound of formula (V)

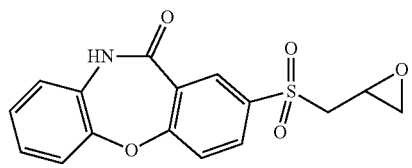

(V)

or any stereochemically isomeric form thereof or a pharmaceutically acceptable salt thereof.

Aspect 10. A compound of formula (VI)

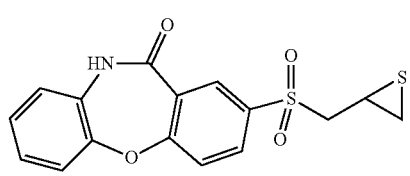

(VI)

or any stereochemically isomeric form thereof or a pharmaceutically acceptable salt thereof.

Aspect 11. A compound of formula (VII)

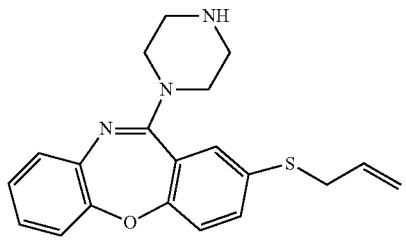

(VII)

or any stereochemically isomeric form thereof or a pharmaceutically acceptable salt thereof.

Aspect 12. A compound of formula (VIII)

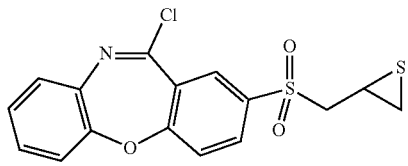

(VIII)

or any stereochemically isomeric form thereof or a pharmaceutically acceptable salt thereof.

Aspect 13. The compound x-(allylthio)dibenzo[b,f][1,4]oxazepin-11(10H)-one, whereby x represents 1, 2, 3, 4, 6, 7, 8, 9, or 10, or any stereochemically isomeric form thereof or a pharmaceutically acceptable salt thereof.

Aspect 14. The compound x-((thiiran-2-ylmethyl)sulfonyl)dibenzo[b,f][1,4]oxazepin-11(10H)-one, whereby x represents 1, 2, 3, 4, 6, 7, 8, 9, or 10, or any stereochemically isomeric form thereof or a pharmaceutically acceptable salt thereof.

Aspect 15. The compound x-((oxiran-2-ylmethyl)sulfonyl)dibenzo[b,f][1,4]oxazepin-11(10H)-one, whereby x represents 1, 2, 3, 4, 6, 7, 8, 9, or 10, or any stereochemically isomeric form thereof or a pharmaceutically acceptable salt thereof.

Aspect 16. The compound x-((thiiran-2-ylmethyl)sulfonyl)dibenzo[b,f][1,4]oxazepine, whereby x represents 1, 2, 3, 4, 6, 7, 8, 9, or 11, or any stereochemically isomeric form thereof or a pharmaceutically acceptable salt thereof.

Aspect 17. The compound x-((oxiran-2-ylmethyl)sulfonyl)dibenzo[b,f][1,4]oxazepine, whereby x represents 1, 2, 3, 4, 6, 7, 8, 9, or 11, or any stereochemically isomeric form thereof or a pharmaceutically acceptable salt thereof.

Aspect 18. The compound x-(allylthio)dibenzo[b,f][1,4]oxazepine, whereby x represents 1, 2, 3, 4, 6, 7, 8, 9, or 11, or any stereochemically isomeric form thereof or a pharmaceutically acceptable salt thereof.

Aspect 19. A compound, whereby such compound is
N-(2-((thiiran-2-ylmethyl)sulfonyl)dibenzo[b,f][1,4]oxazepin-8-yl)acetamide,
2-((thiiran-2-ylmethyl)sulfonyl)dibenzo[b,f][1,4]oxazepine,
11-(piperazin-1-yl)-2-((1-(thiiran-2-yl)ethyl)sulfonyl)dibenzo[b,f][1,4]oxazepine,
2-(but-3-en-1-ylthio)-10-methyldibenzo[b,f][1,4]oxazepin-11(10H)-one,
2-(allylthio)dibenzo[b,f][1,4]thiaphosphepin-8-ol,
8-(((3-methylthiiran-2-yl)methyl)sulfonyl)dibenzo[b,f][1,4]oxazepine,
8-((thiiran-2-ylmethyl)sulfonyl)-10,11-dihydrodibenzo[b,f][1,4]oxazepine,
N-(2-((2-methylthiiran-2-yl)sulfonyl)-11-(piperazin-1-yl)dibenzo[b,f][1,4]oxazepin-8-yl)methanesulfonamide,
8-((oxiran-2-ylmethyl)sulfonyl)benzo[f]pyrimido[4,5-b][1,4]oxazepin-6(5H)-one,
12-(allylthio)dibenzo[b,f][1,2,4]triazolo[4,3-d][1,4]oxazepine,
3-(butoxycarbonyl)-11-(((2-(thiiran-2-yl)ethyl)sulfonyl)methyl)-7-(trifluoromethyl)-5H-dibenzo[b,f]azepine-4-carboxylic acid,
2-(allylthio)dibenzo[b,f][1,4]oxazepin-11(10H)-one,
1,8-bis(cyclopropylmethyl)-2,3,4,5,6,7,8,8a,9,9a-decahydro-1H-fluorene,
N-(3-chlorophenyl)-N-(3-((2,3,4,5,6,7,8,8a,9,9a-decahydro-1H-fluoren-3-yl)sulfonyl)-2-mercaptopropyl)carbonohydrazonoyl dicyanide,
2-((2,3-dihydro-13bH-spiro[dibenzo[b,f]pyrrolo[1,2-d][1,4]oxazepine-1,4'-piperidin]-12-yl)sulfonyl)-2-(thiiran-2-yl)acetonitrile,
4-amino-5-((anthracen-2-ylsulfonyl)(cyclopropyl)methyl)-1-(3-chlorocyclohexyl)-1H-pyrazole-3-carbonitrile,
2,3-bis((dibenzo[b,f][1,4]oxazepin-2-ylsulfonyl)methyl)thiirane,
2-((3-morpholinodibenzo[b,f][1,2,4]triazolo[4,3-d][1,4]oxazepin-6-yl)sulfonyl)-2-(thiiran-2-yeacetonitrile, or
6,7-dimethyl-3-(4-(thiiran-2-yl)phenyl)benzo[b]naphtho[2,3-f][1,2,4]triazolo[4,3-d][1,4]oxazepine,
or any stereochemically isomeric form thereof or a pharmaceutically acceptable salt thereof.

Aspect 20. A compound, whereby such compound is
2-((thiiran-2-ylmethyl)sulfonyl)-10,11-dihydrodibenzo[b,f][1,4]oxazepine,
1-(10,11-dihydrodibenzo[b,f][1,4]oxazepin-2-yl)-2-(thiiran-2-yl)ethan-1-one,
N-(thiiran-2-yl)-10,11-dihydrodibenzo[b,f][1,4]oxazepine-2-carboxamide,
2-(1-(thiiran-2-ylmethyl)cyclopropyl)-10,11-dihydrodibenzo[b,f][1,4]oxazepine,
2-(3-(thiiran-2-ylmethyl)-1,314-oxathietan-3-yl)-10,11-dihydrodibenzo[b,f][1,4]oxazepine,
(Z)-2-(1-fluoro-2-(thiiran-2-yl)vinyl)-10,11-dihydrodibenzo[b,f][1,4]oxazepine,
2-(5-(thiiran-2-yl)-2H-imidazol-4-yl)-10,11-dihydrodibenzo[b,f][1,4]oxazepine,
3-(thiiran-2-ylmethyl)-1H-benzo[2,3][1,4]oxazepino[6,7-e]isoindole,
1-(thiiran-2-ylmethyl)-3H-benzo[2,3][1,4]oxazepino[6,7-f]isoindole,
2-(dimethyl(thiiran-2-ylmethyl)silyl)-10,11-dihydrodibenzo[b,f][1,4]oxazepine,
(10,11-dihydrodibenzo[b,f][1,4]oxazepin-2-yl)(thiiran-2-ylmethyl)silanediol,
1-phenyl-3-(thiiran-2-ylmethyl)-1H-benzo[2,3][1,4]oxazepino[6,7-f]indazole,
N-hydroxy-N-(thiiran-2-ylmethyl)-10,11-dihydrodibenzo[b,f][1,4]oxazepine-2-carboxamide,
1-(10,11-dihydrodibenzo[b,f][1,4]oxazepin-2-yl)-3-(thiiran-2-yl)urea,
2-(1,1,1-trifluoro-3-(thiiran-2-yl)propan-2-yl)-10,11-dihydrodibenzo[b,f][1,4]oxazepine,
(10,11-dihydrodibenzo[b,f][1,4]oxazepin-2-yl)(thiiran-2-ylmethyl)phosphinic acid, (10,11-dihydrodibenzo[b,f][1,4]oxazepin-2-yl)(imino)
(thiiran-2-ylmethyl)-16-sulfanone,
1-(10,11-dihydrodibenzo[b,f][1,4]oxazepin-2-yl)-2-(thiiran-2-yl)ethan-1-ol,
2-((10,11-dihydrodibenzo[b,f][1,4]oxazepin-2-yl)sulfonyl)-1-(thiiran-2-yl)ethan-1-one,
2-((thiiran-2-ylmethyl)sulfinyl)-10,11-dihydrodibenzo[b,f][1,4]oxazepine, or
2-(3-(thiiran-2-ylmethyl)-1,2,314-dioxathiiran-3-yl)-10,11-dihydrodibenzo[b,f][1,4]oxazepine,
or any stereochemically isomeric form thereof or a pharmaceutically acceptable salt thereof.

Aspect 21. A compound, whereby such compound is
10-((oxiran-2-ylmethyl)sulfonyl)benzo[f]quinoline,
2-phenoxy-8-((thiiran-2-ylmethyl)sulfonyl)-10,11-dihydrodibenzo[b,f][1,4]oxazepine,
2,2'-(((10,11-dihydro-5H-dibenzo[a,d][7]annulen-5-yl)sulfonyl)methylene)bis(oxirane),
10-((seleniran-2-ylmethyl)sulfonyl)-7a,8,9,10,11,11a,12,13-octahydro-7H-benzo[e]naphtho[1,2-b]azepin-7-one,
5-amino-4-(2-((8-bromo-9-ethyl-7-methyltetradecahydro-1H-dibenzo[a,d][7]annulen-2-yl)sulfonyl)-1-(thiiran-2-yl)ethyl)-1-(3-chlorophenyl)-1H-pyrazole-3-carbonitrile,
8-((thiiran-2-ylmethyl)sulfonyl)-3-(trifluoromethyl)-10,11-dihydrodibenzo[b,f][1,4]oxazepine
9-((1-(thiiran-2-yl)cyclopenta-2,4-dien-1-yl)sulfonyl)-11,12-dihydro-1H-benzo[2,3][1,4]oxazepino[7,6-g]indole,
(2E,4E,6E)-7-(8-(tert-butyl)-10,11-dihydrodibenzo[b,f][1,4]oxazepin-3-yl)-1-((thiiran-2-ylmethyl)selenonyl)hepta-2,4,6-trien-1-ol,
9-((thiiran-2-ylmethyl)sulfonyl)-7,12-dihydrobenzo[2,3]azepino[4,5-b]indol-6(5H)-one,
N-(10-oxo-8-((thiiran-2-ylmethyl)sulfonyl)-10,11-dihydrobenzo[f]pyrido[4,3-b][1,4]oxazepin-3-yl)acetamide,
8-((thiiran-2-ylmethyl)sulfonyl)-10H-phenothiazine-2-carbonitrile,
3-((thiiran-2-ylmethyl)sulfonyl)-7,12-dihydrobenzo[2,3]azepino[4,5-b]indol-6(5H)-one,
5-((thiiran-2-ylmethyl)sulfonyl)pentyl 6-hydroxy-5-methyl-13-oxo-5,6,7,8,14,15-hexahydro-13H-16-oxa-4b,8a,14-triaza-5,8-methanodibenzo[b,h]cycloocta[jkl]cyclopenta[e]-as-indacene-6-carboxylate,
3-(2-oxo-2-(6-oxo-5,6,7,12-tetrahydrobenzo[2,3]azepino[4,5-b]indol-3-yl)ethyl)thiirane-2-carbonitrile,
N-(1H-pyrazolo[3,4-b]quinoxalin-3-yl)-1-(thiiran-2-yl)methanesulfonamide,
3-amino-6-(6,6-dioxido-2-(thiiran-2-yl)-1,3,4,12a-tetrahydro-2H-benzo[f]pyrazino[1,2-b][1,2,5]thiadiazepin-9-yl)-N-(pyridin-3-yl)pyrazine-2-carboxamide, or
(7,9-dimethyl-3,4-dihydro-[1,4]diazepino[6,7,1-hi]indol-2(1H)-yl)(4-((thiiran-2-ylmethyl)sulfonyl)piperidin-1-yl)methanone,
or any stereochemically isomeric form thereof or a pharmaceutically acceptable salt thereof.

Aspect 22. A compound, whereby such compound is
2-(allylthio)-11-chlorodibenzo[b,f][1,4]oxazepine,
2-(pent-4-en-1-ylthio)dibenzo[b,f][1,4]oxazepine,
11-bromo-2-((2,3-difluoropropyl)thio)dibenzo[b,f][1,4]oxazepine,
((dibenzo[b,f][1,4]oxazepin-2-ylsulfonyl)methyl)boronic acid,
1-(dibenzo[b,f][1,4]oxazepin-2-yloxy)pent-4-en-2-one,
2-((11-chlorodibenzo[b,f][1,4]oxazepin-2-yl)thio)-N-hydroxyacetamide,
11-chloro-2-((thiiran-2-ylmethyl)sulfonyl)dibenzo[b,f][1,4]oxazepine,
8-((thiiran-2-ylmethyl)sulfonyl)-5,11-dihydrodibenzo[b,e][1,4]oxazepine,
11-bromo-2-((seleniran-2-ylmethyl)sulfonyl)dibenzo[b,f][1,4]oxazepine,
12-((thiiran-2-ylmethyl)sulfonyl)dibenzo[b,f][1,2,4]triazolo[4,3-d][1,4]oxazepine,
2-((thiiran-2-ylmethyl)sulfonyl)-11-(trifluoromethyl)dibenzo[b,f][1,4]oxazepine,
11-methyl-2-((thiiran-2-ylmethyl)sulfonyl)dibenzo[b,f][1,4]oxazepine,
3-(1-cyclopropyl-2,2,2-trifluoroethyl)-8,8-dimethyl-7,10-dihydro-8H-pyrano[3'',4'':5',6']pyrido[3',2':4,5]furo[3,2-d]pyrimidin-4(3H)-one,
8-(cyclopropyl(4-methylpiperazin-1-yl)methyl)-3a-methoxy-6,7-dimethyl-2,3,3a,3a1,4,5,5a,6,11,12-decahydro-1H-indolizino[8,1-cd]carbazole,
9-isopropyl-9-methyl-5-(thiiran-2-yl)octadecahydrocyclopenta[5,6]cycloocta[1,2-b]indole,
(E)-1'-(2-methyl-5-(114-thiiran-1-yl)pent-3-en-1-yl)spiro[naphtho[1,2-d]imidazole-2,4'-piperidine]-4,5,6,7,8,9-hexaol,
10-benzyl-5-(6-aza-3-silaspiro[2.5]octan-6-yl)-7,8,9,10,11,12-hexahydro-6H-imidazo[1',2':1,6]pyrido[2,3-b]pyrido[4,3-f]azepine,
N-methyl-N-((3-methyl-3,9-dihydrobenzo[b]imidazo[4,5-e][1,4]oxazin-2-yl)methyl)cyclopropanamine,
3-((methylsulfonyl)methyl)-10H-phenoxazine,
2-((vinylsulfinyl)methyl)-10H-phenoxazine,
1-(dibenzo[b,f][1,4]oxazepin-2-ylsulfonyl)but-3-en-2-one,
1-(3-(2-(1,1-dioxidotetrahydrothiophen-3-yl)propyl)-3-methylthiiran-2-yl)-2-(10-hydroxy-1,2,3,4-tetrahydroanthracen-9-yl)ethan-1-one, or
dodecahydrophenanthro[4a,4b-b]thiirene 11,11-dioxide,
or any stereochemically isomeric form thereof or a pharmaceutically acceptable salt thereof.

Aspect 23. A compound as claimed in Aspect 1 wherein at least one of the substituents $R_1$, $R_2$, $R_3$, $R_4$, $R_7$, $R_8$, $R_9$, and $R_{10}$ is a sulfane or the group of formula (II), provided that $R_5$ and $R_6$ both are not a piperazine.

Aspect 24. A compound as claimed in Aspect 1 wherein at least one of the substituents $R_1$, $R_2$, $R_3$, $R_4$, $R_7$, $R_8$, $R_9$, and $R_{10}$ is a sulfane or the group of formula (II), provided that $R_5$ and $R_6$ are both unsubstituted.

Aspect 25. A compound as claimed in Aspect 1 wherein at least one of the substituents $R_1$, $R_2$, $R_3$, $R_4$, $R_7$, $R_8$, $R_9$, and $R_{10}$ is a sulfane or the group of formula (II), provided that the compound of formula (I) is not amoxapine.

All aspects of the compounds, including individual variable definitions, may be combined with other aspects to form additional compounds. For example, in one embodiment of formula (I), $R_1$ is hydrogen and $R_2$ is aryl. In another embodiment, $R_1$ can be hydrogen and $R_2$ can be heteroaryl.

In certain embodiments, the present invention provides a compound selected from the exemplified examples or a stereoisomer, a tautomer, a pharmaceutically acceptable salt, or a solvate thereof. In another embodiment, the present invention provides a compound selected from any subset list of compounds within the scope of the exemplified examples or a stereoisomer, a tautomer, a pharmaceutically acceptable salt, or a solvate thereof.

Compounds of present invention may form salts with alkali metals such as sodium, potassium and lithium, with alkaline earth metals such as calcium and magnesium, with organic bases such as dicyclohexylamine, tributylamine, pyridine and amino acids such as arginine, lysine and the like. Such salts can be formed as known to those skilled in the art.

The compounds of present disclosure may form salts with a variety of organic and inorganic acids. Such salts include those formed with hydrogen chloride, hydrogen bromide, methanesulfonic acid, sulfuric acid, acetic acid, trifluoroacetic acid, oxalic acid, maleic acid, benzenesulfonic acid, toluenesulfonic acid and various others (e.g., nitrates, phosphates, borates, tartrates, citrates, succinates, benzoates, ascorbates, salicylates and the like). Such salts can be formed as known to those skilled in the art. Representative salts include the hydrobromide, hydrochloride, sulfate, bisulfate, phosphate, nitrate, acetate, valerate, oleate, palmitate, stearate, laurate, benzoate, lactate, phosphate, tosylate, citrate, maleate, fumarate, succinate, tartrate, napthylate, mesylate, glucoheptonate, lactobionate, and laurylsulphonate salts and the like. (See, for example, S. M. Berge et al., "Pharmaceutical Salts," *J. Pharm. Sci.*, 66, 1-19 (1977), which, as well as all other documents referred to herein, is incorporated herein by reference.) In addition, zwitterions ("inner salts") may be formed.

The present invention is also intended to include all isotopes of atoms occurring in the present compounds. Isotopes include those atoms having the same atomic number but different mass numbers. By way of general example and without limitation, isotopes of hydrogen include deuterium and tritium. Isotopically-labeled compounds of the invention can generally be prepared by conventional techniques known to those skilled in the art or by processes analogous to those described herein, using an appropriate isotopically-labeled reagent in place of the non-labeled reagent otherwise employed.

Compounds of present invention may also have prodrug forms. Since prodrugs are known to enhance numerous desirable qualities of pharmaceuticals (e.g., solubility, bioavailability, manufacturing, etc.) the compounds of the present invention may be delivered in prodrug form. Thus, the present invention, is intended to cover prodrugs of the presently claimed compounds, methods of delivering the same and compositions containing the same. "Prodrugs" are intended to include any covalently bonded carriers that release an active parent drug of the present invention in vivo when such prodrug is administered to a mammalian subject. Prodrugs of the present invention are prepared by modifying functional groups present in the compound in such a way that the modifications are cleaved, either in routine manipulation or in vivo, to the parent compound. Prodrugs include compounds of the present invention wherein a hydroxy, amino, or sulfhydryl group is bonded to any group that, when the prodrug of the present invention is administered to a mammalian subject, it cleaves to form a free hydroxyl, free amino, or free sulfhydryl group, respectively. Examples of prodrugs include, but are not limited to, acetate, formate, and benzoate derivatives of alcohol and amine functional groups in the compounds of the present invention. For other examples see also Rautio J, et al. "Prodrugs: design and clinical applications." *Nat Rev Drug Discov.* 2008 March; 7(3):255-70.

In certain embodiments of present invention, such prodrugs of compounds of present disclosure may carry functional groups known in the arts to improve water solubility. See, for example, Gooyit M., et. al. "Selective water-soluble gelatinase inhibitor prodrugs." *J Med Chem.* 2011 Oct. 13; 54(19):6676-90.), which is incorporated herein by reference in its entirety.

It should further be understood that solvates (e.g., hydrates) of the compounds of present disclosure are also within the scope of the invention. Methods of solvation are generally known in the art. The inventive compounds may either be in the free or hydrate form.

Compounds of this invention may have one or more asymmetric centers. Unless otherwise indicated, all chiral (enantiomeric and diastereomeric) and racemic forms of compounds of the present invention are included in the present invention. Many geometric isomers of olefins, C=N double bonds, and the like can also be present in the compounds, and all such stable isomers are contemplated in the present invention. Cis and trans geometric isomers of the compounds of the present invention are described and may be isolated as a mixture of isomers or as separated isomeric forms. The present compounds can be isolated in optically active or racemic forms. It is well known in the art how to prepare optically active forms, such as by resolution of racemic forms or by synthesis from optically active starting materials. All chiral, (enantiomeric and diastereomeric) and racemic forms and all geometric isomeric forms of a structure are intended, unless the specific stereochemistry or isomer form is specifically indicated. When no specific mention is made of the configuration (cis, trans or R or S) of a compound (or of an asymmetric carbon), then any one of the isomers or a mixture of more than one isomer is intended. The processes for preparation can use racemates, enantiomers, or diastereomers as starting materials. All processes used to prepare compounds of the present invention and intermediates made therein are considered to be part of the present invention. When enantiomeric or diastereomeric products are prepared, they can be separated by conventional methods, for example, by chromatography or fractional crystallization. Compounds of the present invention, and salts thereof, may exist in multiple tautomeric forms, in which hydrogen atoms are transposed to other parts of the molecules and the chemical bonds between the atoms of the molecules are consequently rearranged. It should be understood that all tautomeric forms, insofar as they may exist, are included within the invention.

Furthermore, some compounds and some of the intermediates used in their preparation may exhibit polymorphism. It is to be understood that the present invention encompasses any polymorphic forms possessing properties useful in the treatment of the conditions and diseases noted hereinabove.

The pharmaceutically acceptable acid addition salts as mentioned hereinabove are meant to comprise the therapeutically active non-toxic acid addition salt forms that the compounds of present disclosure are able to form. These pharmaceutically acceptable acid addition salts can conveniently be obtained by treating the base form with such appropriate acid. Appropriate acids comprise, for example, inorganic acids such as hydrohalic acids, e.g. hydrochloric or hydrobromic acid, sulfuric, nitric, phosphoric and the like acids; or organic acids such as, for example, acetic, propanoic, hydroxyacetic, lactic, pyruvic, oxalic (i.e. ethanedioic), malonic, succinic (i.e. butanedioic acid), maleic, fumaric, malic, tartaric, citric, methanesulfonic, ethanesulfonic, benzenesulfonic, p-toluenesulfonic, cyclamic, salicylic, p-aminosalicylic, pamoic and the like acids. Conversely said salt forms can be converted by treatment with an appropriate base into the free base form.

In another embodiment, compounds of present invention have particular utility in treating proliferative conditions, such as cancer. Accordingly, one aspect of the invention is the use of such a compound, or a pharmaceutically acceptable salt thereof in the manufacture of a medicament for use in the production of an antiproliferative effect in a warm-blooded animal such as a human being.

According to a further feature of the invention there is provided a method for producing an antiproliferative effect in a warm-blooded animal, such as a human being, in need of such treatment which comprises administering to said animal an effective amount of a compound of present invention or a pharmaceutically acceptable salt thereof as defined herein before.

The anti-proliferative treatment defined herein before may be applied as a sole therapy or may involve, in addition to a compound of the invention, one or more other substances and/or treatments. Such treatment may be achieved by way of the simultaneous, sequential or separate administration of the individual components of the treatment. The compounds of this invention may also be useful in combination with known anti-cancer and cytotoxic agents and treatments, including radiation. Compounds of present disclosure may be used sequentially with known anticancer or cytotoxic agents and treatment, including radiation when a combination formulation is inappropriate.

An aspect of the invention is a method for treating a subject in need of medical attention, comprising administering to said subject a therapeutically active amount of a compound of present disclosure and a radiation therapy.

An aspect of the invention is a method for treating a subject in need of medical attention, comprising administering to said subject a therapeutically active amount of a compound of present disclosure and a therapeutically active amount of a cancer drug, an immuno-oncology drug, or an antiproliferative agent.

The present invention further includes compositions comprising one or more compounds of present disclosure and a pharmaceutically acceptable carrier.

A "pharmaceutically acceptable carrier" as used herein refers to media generally accepted in the art for the delivery of active agents to animals, in particular, mammals. Pharmaceutically acceptable carriers are formulated according to a number of factors well within the purview of those of ordinary skill in the art. These include, without limitation: the type and nature of the active agent being formulated; the subject to which the agent-containing composition is to be administered; the intended route of administration of the composition; and, the therapeutic indication being targeted. Pharmaceutically acceptable carriers include both aqueous and non-aqueous liquid media, as well as a variety of solid and semi-solid dosage forms. Such carriers can include a number of different ingredients and additives in addition to the active agent, such additional ingredients being included in the formulation for a variety of reasons, e.g., stabilization of the active agent, binders, etc., well known to those of ordinary skill in the art. Descriptions of suitable pharmaceutically acceptable carriers, and factors involved in their selection, are found in a variety of readily available sources such as, for example, *Remington's Pharmaceutical Sciences*, 17th ed. (1985), which is incorporated herein by reference in its entirety.

Accordingly, an aspect of the invention is a process for preparing a pharmaceutical composition, wherein a therapeutically effective amount of one or more compounds of present disclosure is intimately mixed with a pharmaceutically acceptable carrier.

The pharmaceutical compositions of the invention containing the active ingredient may be in a form suitable for oral use, for example, as tablets, troches, lozenges, aqueous or oily suspensions, dispersible powders or granules, emulsions, hard or soft capsules, or syrups or elixirs. Compositions intended for oral use may be prepared according to any method known to the art for the manufacture of pharmaceutical compositions and such compositions may contain one or more agents selected from the group consisting of sweetening agents, flavoring agents, coloring agents and preserving agents in order to provide pharmaceutically elegant and palatable preparations.

Formulations for oral use may also be presented as hard gelatin capsules wherein the active ingredient is mixed with an inert solid diluent, for example, calcium carbonate, calcium phosphate or kaolin, or as soft gelatin capsules wherein the active ingredient is mixed with water soluble carrier such as polyethyleneglycol or an oil medium, for example peanut oil, liquid paraffin, or olive oil.

The pharmaceutical compositions may be in the form of sterile injectable aqueous solutions. Among the acceptable vehicles and solvents that may be employed are water, Ringer's solution and isotonic sodium chloride solution. The sterile injectable preparation may also be a sterile injectable oil-in-water microemulsion where the active ingredient is dissolved in the oily phase. For example, the active ingredient may be first dissolved in a mixture of soybean oil and lecithin. The oil solution then introduced into a water and glycerol mixture and processed to form a microemulsion.

The injectable solutions or microemulsions may be introduced into a patient's blood-stream by local bolus injection. Alternatively, it may be advantageous to administer the solution or microemulsion in such a way as to maintain a constant circulating concentration of the instant compound. In order to maintain such a constant concentration, a continuous intravenous delivery device may be utilized. An example of such a device is the Deltec CADD-PLUS® Model 5400 intravenous pump.

The pharmaceutical compositions may be in the form of a sterile injectable aqueous or oleagenous suspension for intramuscular and subcutaneous administration. This suspension may be formulated according to the known art using those suitable dispersing or wetting agents and suspending agents which have been mentioned above.

The compounds of present invention may be administered by any means suitable for the condition to be treated, which may depend on the need for site-specific treatment or quantity of drug to be delivered. Topical administration is generally preferred for skin-related diseases, and systematic treatment preferred for cancerous or pre-cancerous conditions, although other modes of delivery are contemplated. For example, the compounds may be delivered orally, such as in the form of Tablets, capsules, granules, powders, or liquid formulations including syrups; topically, such as in the form of solutions, suspensions, gels or ointments; sublingually; bucally; parenterally, such as by subcutaneous, intravenous, intramuscular or infrasternal injection or infusion techniques (e.g., as sterile injectable aq. or non-aq. solutions or suspensions); nasally such as by inhalation spray; topically, such as in the form of a cream or ointment; rectally such as in the form of suppositories; or liposomally. Dosage unit formulations containing non-toxic, pharmaceutically acceptable vehicles or diluents may be administered. The compounds may be administered in a form suitable for immediate release or extended release Immediate release or extended release may be achieved with suitable pharmaceutical compositions or, particularly in the case of extended release, with devices such as subcutaneous implants or osmotic pumps.

The disclosed compounds may exist in both unsolvated and solvated forms. The term 'solvate' is used herein to describe a molecular association comprising a compound of the invention and one or more pharmaceutically acceptable solvent molecules, e.g. water or ethanol. The term 'hydrate' is used when said solvent is water.

The compounds of the present invention can be in any suitable form, without limitation. Forms suitable for oral use, include, but are not limited to, tablets, troches, lozenges, aqueous or oily suspensions, dispersible powders or granules, emulsions, hard or soft capsules, solutions, syrups and elixirs. Compositions intended for oral use may be prepared according to any method known to the art for the manufacture of pharmaceutical compositions.

The compounds can be formulated with other ingredients, e.g., "pharmaceutically acceptable carriers" or "excipients" to indicate they are combined with the active drug and can be administered safely to a subject for therapeutic purposes. These include, but are not limited to, antioxidants, preservatives, dyes, tablet-coating compositions, plasticizers, inert carriers, excipients, polymers, coating materials, osmotic barriers, devices and agents which slow or retard solubility, etc.

The compositions intended for oral use may be prepared according to any suitable method known to the art for the manufacture of pharmaceutical compositions. Such compositions may contain one or more agents selected from the group consisting of diluents, sweetening agents, flavoring agents, coloring agents and preserving agents in order to provide palatable preparations.

Non-toxic pharmaceutically acceptable excipients that are suitable for the manufacture of tablets. These excipients may be, for example, inert diluents, such as calcium carbonate, sodium carbonate, lactose, calcium phosphate or sodium phosphate; granulating and disintegrating agents, for example, corn starch, or alginic acid; and binding agents, for example magnesium stearate, stearic acid or talc.

Formulations for oral use may also be presented as hard gelatin capsules wherein the active ingredient is mixed with an inert solid diluent, for example, calcium carbonate, calcium phosphate or kaolin, or as soft gelatin capsules wherein the active ingredient is mixed with water or an oil medium, for example peanut oil, liquid paraffin or olive oil.

Aqueous suspensions containing the active materials in admixture with excipients suitable for the manufacture of aqueous suspensions may also be used. Such excipients are suspending agents, for example sodium carboxymethylcellulose, methylcellulose, hydroxypropyl-methylcellulose, sodium alginate, polyvinylpyrrolidone, gum tragacanth and gum acacia; dispersing or wetting agents may be a naturally-occurring phosphatide, for example, lecithin, or condensation products of an alkylene oxide with fatty acids, for example polyoxyethylene stearate, or condensation products of ethylene oxide with long chain aliphatic alcohols, for example heptadecaethylene oxycetanol, or condensation products of ethylene oxide with partial esters derived from fatty acids and hexitol such as polyoxyethylene sorbitol monooleate, or condensation products of ethylene oxide with partial esters derived from fatty acids and hexitol anhydrides, for example polyethylene sorbitan monooleate. The aqueous suspensions may also contain one or more preservatives, for example ethyl, or n-propyl p- hydroxybenzoate, one or more coloring agents, one or more flavoring agents, and one or more sweetening agents, such as sucrose.

Dispersible powders and granules suitable for preparation of an aqueous suspension by the addition of water provide the active ingredient in admixture with a dispersing or wetting agent, suspending agent and one or more preservatives. Suitable dispersing or wetting agents and suspending agents are exemplified by those already mentioned above. Additional excipients, for example, sweetening, flavoring and coloring agents, may also be present.

The compounds may also be in the form of non-aqueous liquid formulations, e.g., oily suspensions which may be formulated by suspending the active ingredients in a vegetable oil, for example arachis oil, olive oil, sesame oil or peanut oil, or in a mineral oil such as liquid paraffin. The oily suspensions may contain a thickening agent, for example beeswax, hard paraffin or cetyl alcohol. Sweetening agents such as those set forth above, and flavoring agents may be added to provide palatable oral preparations. These compositions may be preserved by the addition of an anti-oxidant such as ascorbic acid.

Pharmaceutical compositions of the invention may also be in the form of oil-in-water emulsions. The oily phase may be a vegetable oil, for example olive oil or arachis oil, or a mineral oil, for example liquid paraffin or mixtures of these. Suitable emulsifying agents may be naturally-occurring gums, for example gum acacia or gum tragacanth, naturally-occurring phosphatides, for example soy bean, lecithin, and esters or partial esters derived from fatty acids and hexitol anhydrides, for example sorbitan monooleate, and condensation products of the said partial esters with ethylene oxide, for example polyoxyethylene sorbitan monooleate. The emulsions may also contain sweetening and flavoring agents.

Syrups and elixirs may be formulated with sweetening agents, for example glycerol, propylene glycol, sorbitol or sucrose. Such formulations may also contain a demulcent, a preservative and flavoring and coloring agents.

The compounds may also be administered in the form of suppositories for rectal or vaginal administration of the drug. These compositions can be prepared by mixing the drug with a suitable non-irritating excipient which is solid at ordinary temperatures but liquid at the rectal temperature or vaginal temperature and will therefore melt in the rectum or vagina to release the drug. Such materials include cocoa butter and polyethylene glycols.

The compounds of the invention may also be administered transdermally using methods known to those skilled in the art (see, for example, WO1994004157). For example, a solution or suspension of a compound of Formula I in a suitable volatile solvent optionally containing penetration enhancing agents can be combined with additional additives known to those skilled in the art, such as matrix materials and bacteriocides. After sterilization, the resulting mixture can be formulated following known procedures into dosage forms. In addition, on treatment with emulsifying agents and water, a solution or suspension of a compound of Formula I may be formulated into a lotion or salve.

Suitable solvents for processing transdermal delivery systems are known to those skilled in the art, and include lower alcohols such as ethanol or isopropyl alcohol, lower ketones such as acetone, lower carboxylic acid esters such as ethyl acetate, polar ethers such as tetrahydrofuran, lower hydrocarbons such as hexane, cyclohexane or benzene, or halogenated hydrocarbons such as dichloromethane, chloroform, trichlorotrifluoroethane, or trichlorofluoroethane. Suitable solvents may also include mixtures of one or more materials selected from lower alcohols, lower ketones, lower carboxylic acid esters, polar ethers, lower hydrocarbons, halogenated hydrocarbons.

Suitable penetration enhancing materials for transdermal delivery system are known to those skilled in the art, and include, for example, monohydroxy or polyhydroxy alcohols such as ethanol, propylene glycol or benzyl alcohol, saturated or unsaturated C8-C18 fatty alcohols such as lauryl alcohol or cetyl alcohol, saturated or unsaturated C8-C18 fatty acids such as stearic acid, saturated or unsaturated fatty esters with up to 24 carbons such as methyl, ethyl, propyl, isopropyl, n-butyl, sec-butyl, isobutyl, tertbutyl or mono- glycerin esters of acetic acid, capronic acid, lauric acid, myristinic acid, stearic acid, or palmitic acid, or diesters of saturated or unsaturated dicarboxylic acids with a total of up to 24 carbons such as diisopropyl adipate, diisobutyl adipate, diisopropyl sebacate, diisopropyl maleate, or diisopropyl fumarate. Additional penetration enhancing materials include phosphatidyl derivatives such as lecithin or ceph- alin, terpenes, amides, ketones, ureas and their derivatives, and ethers such as dimethyl isosorbid and diethyleneglycol monoethyl ether. Suitable penetration enhancing formula- tions may also include mixtures of one or more materials selected from monohydroxy or polyhydroxy alcohols, satu- rated or unsaturated C8-C18 fatty alcohols, saturated or unsaturated C8-C18 fatty acids, saturated or unsaturated fatty esters with up to 24 carbons, diesters of saturated or unsaturated discarboxylic acids with up to 24 carbons, phosphatidyl derivatives, terpenes, amides, ketones, ureas and their derivatives, and ethers.

Suitable binding materials for transdermal delivery sys- tems are known to those skilled in the art and include polyacrylates, silicones, polyurethanes, block polymers, sty- renebutadiene copolymers, and natural and synthetic rub- bers. Cellulose ethers, derivatized polyethylenes, and sili- cates may also be used as matrix components. Additional additives, such as viscous resins or oils may be added to increase the viscosity of the matrix.

Compositions comprising the compounds can also be formulated for controlled release, where release of the active ingredient is regulated or modulated to achieve a desired rate of delivery into the systemic circulation. A controlled release formulation can be pulsed, delayed, extended, slow, steady, immediate, rapid, fast, etc. It can comprise one or more release formulations, e.g. extended- and immediate-release components. Extended delivery systems can be utilized to achieve a dosing internal of once every 24 hours, once every 12 hours, once every 8 hours, once every 6 hours, etc. The dosage form/delivery system can be a tablet or a capsule suited for extended release, but a sustained release liquid or suspension can also be used. A controlled release pharma- ceutical formulation can be produced which maintains the release of, and or peak blood plasma levels of a compound of the present invention.

Compounds of the invention may also be administered to the nasal mucosa thereby delivering the agent through the olfactory epithelium into or along olfactory neurons and the olfactory neural pathway to the brain of a mammal or preferentially a human subject. Compounds of the invention may also be administered to a central nervous system of a mammal by administering a composition comprising an effective amount of the compound to a tissue of the mammal innervated by the trigeminal nerve, the olfactory nerve, or a combination thereof, wherein the compound is absorbed through the tissue and transported into the central nervous system of the mammal in an amount effective to provide a diagnostic, protective, or therapeutic effect on a cell of the central nervous system.

Compounds of the invention may be combined with a pharmaceutically-acceptable carrier, or a transfer compo- nent, or a combination thereof; the composition containing the compound in an amount effective for treating or pre- venting a brain disease or disorder in the mammal. Suitable pharmaceutically-acceptable carrier are known in the arts.

The composition can include, for example, any pharmaceu- tically acceptable additive, carrier, or adjuvant that is suit- able for administering a compound to tissue innervated by the olfactory and/or trigeminal nerves. Preferably, the phar- maceutical composition can be employed in diagnosis, pre- vention, or treatment of a disease, disorder, or injury of the CNS, brain, and/or spinal cord. Preferably, the composition includes compounds in combination with a pharmaceutical carrier, additive, and/or adjuvant that can promote the trans- fer of the compound within or through tissue innervated by the olfactory and/or trigeminal nerves. Alternatively, the compound may be combined with substances that may assist in transporting the compounds to sites of malignancy or nerve cell damage.

The composition typically contains a pharmaceutically acceptable carrier mixed with the compound and other components in the pharmaceutical composition. By "phar- maceutically acceptable carrier" is intended a carrier that is conventionally used in the art to facilitate the storage, administration, and/or the healing effect of the active ingre- dients. A carrier may also reduce any undesirable side effects of the compound. A suitable carrier should be stable, i.e., incapable of reacting with other ingredients in the formula- tion. It should not produce significant local or systemic adverse effect in recipients at the dosages and concentrations employed for treatment. Such carriers are generally known in the art.

Suitable carriers for this invention include those conven- tionally used for large stable macromolecules such as albu- min, gelatin, collagen, polysaccharide, monosaccharides, polyvinylpyrrolidone, polylactic acid, polyglycolic acid, polymeric amino acids, fixed oils, ethyl oleate, liposomes, glucose, sucrose, lactose, mannose, dextrose, dextran, cel- lulose, mannitol, sorbitol, polyethylene glycol (PEG), and the like.

Water, saline, aqueous dextrose, and glycols are preferred liquid carriers, particularly (when isotonic) for solutions. The carrier can be selected from various oils, including those of petroleum, animal, vegetable or synthetic origin, for example, peanut oil, soybean oil, mineral oil, sesame oil, and the like. Suitable pharmaceutical excipients include starch, cellulose, talc, glucose, lactose, sucrose, gelatin, malt, rice, flour, chalk, silica gel, magnesium stearate, sodium stearate, glycerol monostearate, sodium chloride, dried skim milk, glycerol, propylene glycol, water, ethanol, and the like. The compositions can be subjected to conventional pharmaceu- tical expedients, such as sterilization, and can contain con- ventional pharmaceutical additives, such as preservatives, stabilizing cytokines, wetting, or emulsifying agents, salts for adjusting osmotic pressure, buffers, and the like.

A composition formulated for intranasal delivery may optionally comprise an odorant. An odorant agent is com- bined with the compound to provide an odorliferous sensa- tion, and/or to encourage inhalation of the intranasal prepa- ration to enhance delivery of the active ingredients to the olfactory neuroepithelium. The odorliferous sensation pro- vided by the odorant agent may be pleasant, obnoxious, or otherwise malodorous. The odorant receptor neurons are localized to the olfactory epithelium that, in humans, occu- pies only a few square centimeters in the upper part of the nasal cavity. Use of a lipophillic odorant agent having moderate to high affinity for odorant binding protein (OBP) is preferred. OBP has an affinity for small lipophillic mol- ecules found in nasal secretions and may act as a carrier to enhance the transport of a lipophillic odorant substance and compounds of present invention to the olfactory receptor neurons. It is also preferred that an odorant agent is capable of associating with lipophillic additives such as liposomes and micelles within the preparation to further enhance delivery of the compounds by means of OBP to the olfactory neuroepithelium. OBP may also bind directly to lipophillic agents to enhance transport of the compounds to olfactory neural receptors.

Suitable odorants having a high affinity for OBP include terpanoids such as cetralva and citronellol, aldehydes such as amyl cinnamaldehyde and hexyl cinnamaldehyde, esters such as octyl isovalerate, jasmines such as CIS-jasmine and jasmal, and musk 89. Other suitable odorant agents include those which may be capable of stimulating odorant-sensitive enzymes such as aderrylate cyclase and guanylate cyclase, or which may be capable of modifying ion channels within the olfactory system to enhance absorption of the compounds.

Other acceptable components in the composition include, but are not limited to, pharmaceutically acceptable agents that modify isotonicity, including water, salts, sugars, polyols, amino acids and buffers, such as, phosphate, citrate, succinate, acetate, and other organic acids or their salts. Typically, the pharmaceutically acceptable carrier also includes one or more stabilizers, reducing agents, antioxidants and/or anti-oxidant chelating agents. The use of buffers, stabilizers, reducing agents, anti-oxidants and chelating agents in the preparation of protein based compositions, particularly pharmaceutical compositions, is well known in the art.

Suitable buffers include acetate, adipate, benzoate, citrate, lactate, maleate, phosphate, tartarate, borate, tri(hydroxymethyl aminomethane), succinate, glycine, histidine, the salts of various amino acids, or the like, or combinations thereof. Suitable salts and isotonicifiers include sodium chloride, dextrose, mannitol, sucrose, trehalose, or the like. Where the carrier is a liquid, it is preferred that the carrier is hypotonic or isotonic with oral, conjunctival or dermal fluids and have a pH within the range of 4.5-8.5. Where the carrier is in powdered form, it is preferred that the carrier is also within an acceptable non-toxic pH range.

Suitable reducing agents, which maintain the reduction of reduced cysteines, include dithiothreitol (DTT also known as Cleland's reagent) or dithioerythritol at 0.01% to 0.1% wt/wt; acetylcysteine or cysteine at 0.1% to 0.5% (pH 2-3); and thioglycerol at 0.1% to 0.5% (pH 3.5 to 7.0) and glutathione. Suitable antioxidants include sodium bisulfite, sodium sulfite, sodium metabisulfite, sodium thiosulfate, sodium formaldehyde sulfoxylate, and ascorbic acid. Suitable chelating agents, which chelate trace metals to prevent the trace metal catalyzed oxidation of reduced cysteines, include citrate, tartarate, ethylenediaminetetraacetic acid (EDTA) in its disodium, tetrasodium, and calcium disodium salts, and diethylenetriamine pentaacetic acid (DTPA).

The composition can include one or more preservatives such as phenol, cresol, p-aminobenzoic acid, BDSA, sorbitrate, chlorhexidine, benzalkonium chloride, or the like. Suitable stabilizers include carbohydrates such as trehalose or glycerol. The composition can include a stabilizer such as one or more of microcrystalline cellulose, magnesium stearate, mannitol, sucrose to stabilize, for example, the physical form of the composition; and one or more of glycine, arginine, hydrolyzed collagen, or protease inhibitors to stabilize, for example, the chemical structure of the composition. Suitable suspending additives include carboxymethyl cellulose, hydroxypropyl methylcellulose, hyaluronic acid, alginate, chondroitin sulfate, dextran, maltodextrin, dextran sulfate, or the like. The composition can include an emulsifier such as polysorbate 20, polysorbate 80, pluronic, triolein, soybean oil, lecithins, squalene and squalanes, sorbitan treioleate, or the like. The composition can include an antimicrobial such as phenylethyl alcohol, phenol, cresol, benzalkonium chloride, phenoxyethanol, chlorhexidine, thimerosol, or the like. Suitable thickeners include natural polysaccharides such as mannans, arabinans, alginate, hyaluronic acid, dextrose, or the like; and synthetic ones like the PEG hydrogels of low molecular weight and aforementioned cytokines.

The composition can include an adjuvant such as cetyl trimethyl ammonium bromide, BDSA, cholate, deoxycholate, polysorbate 20 and 80, fusidic acid, or the like, and a cationic lipid. Suitable sugars include glycerol, threose, glucose, galactose, mannitol, and sorbitol. A suitable protein is human serum albumin.

Preferred compositions include one or more of a solubility enhancing additive, preferably a cyclodextrin; a hydrophilic additive, preferably a monosaccharide or oligosaccharide; an absorption promoting additive, preferably a cholate, a deoxycholate, a fusidic acid, or a chitosan; a cationic surfactant, preferably a cetyl trimethyl ammonium bromide; a viscosity enhancing additive, preferably to promote residence time of the composition at the site of administration, preferably a carboxymethyl cellulose, a maltodextrin, an alginic acid, a hyaluronic acid, or a chondroitin sulfate; or a sustained release matrix, preferably a polyanhydride, a polyorthoester, a hydrogel, a particulate slow release depo system, preferably a polylactide co-glycolides (PLG), a depo foam, a starch microsphere, or a cellulose derived buccal system; a lipid-based carrier, preferably an emulsion, a liposome, a niosomes, or a micelles. The composition can include a bilayer destabilizing additive, preferably a phosphatidyl ethanolamine; a fusogenic additive, preferably a cholesterol hemisuccinate.

Other preferred compositions for sublingual administration including, for example, a bioadhesive to retain the compounds of present invention sublingually; a spray, paint, or swab applied to the tongue; retaining a slow dissolving pill or lozenge under the tongue; or the like. Other preferred compositions for transdermal administration include a bioadhesive to retain the compounds on or in the skin; a spray, paint, cosmetic, or swab applied to the skin; or the like.

These lists of carriers and additives is by no means complete and a worker skilled in the art can choose excipients from the GRAS (generally regarded as safe) list of chemicals allowed in the pharmaceutical preparations and those that are currently allowed in topical and parenteral formulations.

From the foregoing description, one skilled in the art can easily ascertain the essential characteristics of this invention and, without departing from the spirit and scope thereof, can make various changes and modifications of the invention to adapt it to various usages and conditions.

EXAMPLES

The following examples describe and illustrate the methods for the preparation of the compounds of the present invention, as well as other aspects of the present invention, and the results achieved thereby, in further detail. Both an explanation of, and the actual procedures for, the various aspects of the present invention are described where appropriate. These examples are intended to be merely illustrative of the present invention, and not limiting thereof in either scope or spirit. Those of skill in the art will readily understand that known variations of the conditions and processes of the preparative procedures described in these examples can be used to prepare the compounds of the present invention, and the pharmaceutical compositions comprising such compounds.

Example 1

The synthesis of (substituted) tricyclic compounds of general formula (I) is known in the arts (see, for example, Tsvelikhovsky D, et al., "Concise palladium-catalyzed synthesis of dibenzodiazepines and structural analogues." *J Am Chem Soc.* 2011 Sep. 14; 133(36):14228-31, U.S. Pat. Nos. 5,212,169, 8,461,145 or 8,927,710, and references therein.) Also the synthesis of compounds of general formula (II) is known in the arts (see, for example, U.S. Pat. Nos. 8,093,287 or 9,321,754, and references therein.) Nonlimiting examples of compounds of present invention are provided above and in FIGS. 2-5. In general, the compounds of the present invention may be prepared by the methods illustrated in the following general reaction steps, or by modifications thereof, using readily available starting materials, reagents and conventional synthesis procedures.

Step 1: Synthesis of 3

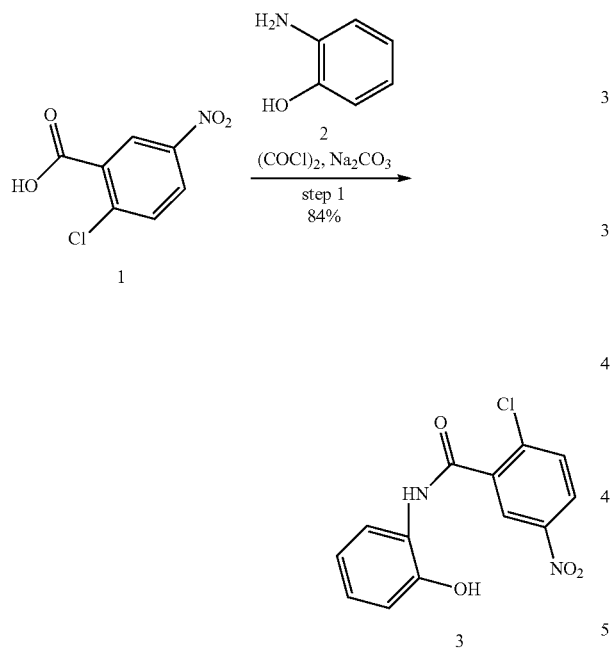

Oxalyl chloride (25.2 g, 198.4 mmol, 2.0 equiv.) was added dropwise to a suspension of compound 1 (22.0 g, 99.2 mmol, 1.0 equiv.) in DCM (250 mL). The resulting yellow solution was stirred under argon at room temperature overnight. The solvent was removed under vacuum to give a yellow solid. The solid was dissolved in 120 mL of diethyl ether and then added to an ice-cooled mixture of o-aminophenol (10.8 g, 99.2 mmol, 1.0 equiv.) and sodium bicarbonate (16.6 g, 198.4 mmol, 2.0 equiv.), water (72 mL) and THF (40 mL) over a period of 1 hour. The mixture was allowed to warm to room temperature and stirred overnight. The precipitate was filtered and washed sequentially with water (3×100 mL), 2N HCl (3×100 mL) and diethyl ether (3×50 mL) to give compound 3 (27.0 g, yield: 84%) as a yellow solid.

Step 2: Synthesis of 4

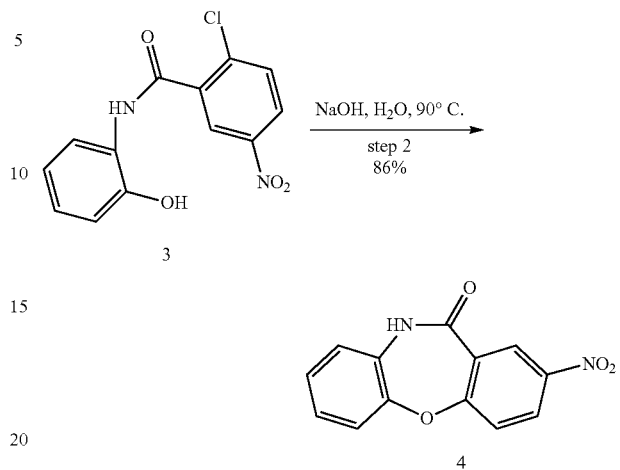

A solution of sodium hydroxide (1.5 g, 26.0 mmol, 1.1 equiv.) in water (210 mL) was added to compound 3 (7.0 g, 24.0 mmol, 1.0 equiv.) and the resulting solution heated to 90° C. for 6 h. The precipitate was filtered and washed with water (400 mL) to give compound 4 (5.3 g, yield: 86%) as a yellow solid.

Step 3: Synthesis of 5

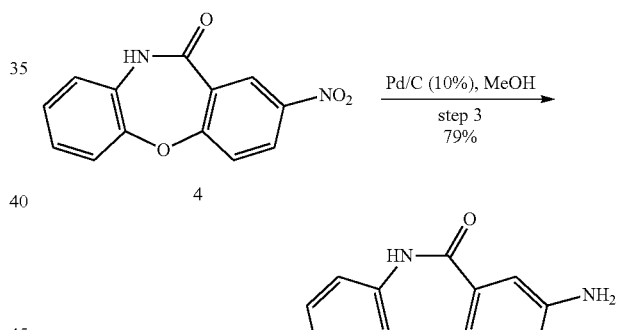

Pd/C (530.0 mg, 10% w/w) was added to a solution of compound 4 (5.3 g, 20.6 mmol, 1.0 equiv.) in MeOH and the mixture was stirred under $H_2$ at room temperature overnight. The mixture was filtered and evaporated to give compound 5 (3.7 g, yield: 79%) as a yellow solid.

Step 4: Synthesis of 6

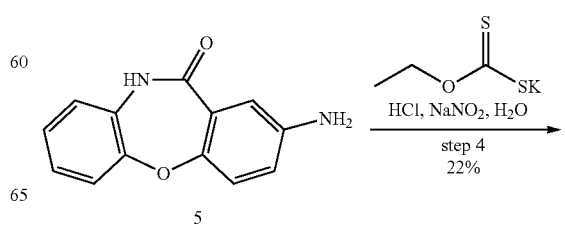

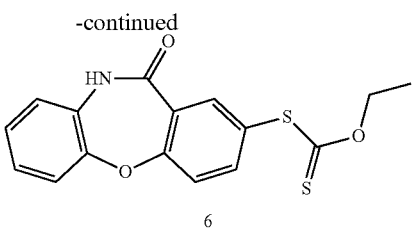

6

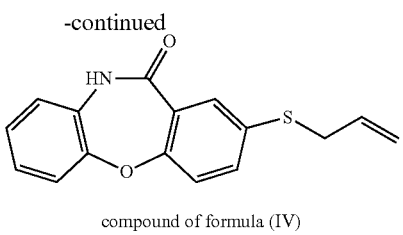

compound of formula (IV)

First, compound 5 (3.7 g, 14.4 mmol, 1.0 eq.) was dissolved in methanol (60 mL) at 0° C. Then hydrochloric acid (1.8 mL) was added. Then sodium nitrite (1.1 g, 15.9 mmol, 1.1 equiv.) solution in water (6 mL) was added dropwise and the solution was stirred for 15 min at 0° C. The resulting reaction mixture was added dropwise to dithiocarbonate 0-ethyl potassium (4.6 g, 28.8 mmol, 2 eq.) in water (20 mL) heated to 65° C. The reaction mixture was stirred at 65° C. for 30 min and then cooled down to room temperature. Water was added and extracted twice with ethyl acetate. The combined organic layer was washed twice with water, saturated sodium bicarbonate and saturated brine, dried over anhydrous sodium sulfate, then filtered and the filtrate concentrated under reduced pressure. The obtained residue was purified with flash silica gel column chromatography (Petroleum ether/EtOAc=7:3) to give compound 6 (1.2 g, 22%) as a yellow solid.

Step 5: Synthesis of 7

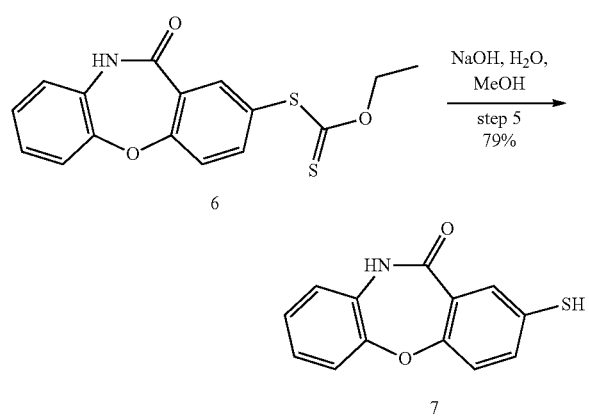

NaOH (0.29 g, 7.2 mmol, 2.0 eq.) in H₂O (6 mL) was added to a solution of compound 6 (1.2 g, 3.6 mmol, 1.0 eq.) in EtOH (12 mL) and the mixture was stirred at room temperature overnight. The next day, the pH value of the mixture was adjusted with 2 N HCl to pH 2-3 to precipitate compound 7 as a white solid. The precipitate was filtered and washed with water (3×100 mL) to give compound 7 (0.7 g, yield: 79%).

Step 6: Synthesis of the compound of formula (IV)

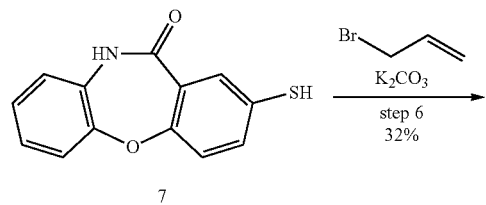

K₂CO₃ (84.0 mg, 0.6 mmol, 1.0 equiv.) and allyl bromide (75.0 mg, 0.6 mmol, 1.0 equiv.) were added to a stirred solution of compound 7 (150.0 mg, 0.6 mmol, 1.0 equiv.) in DMF (2 mL). The mixture was stirred for 15 min at 0° C. before stirring overnight at room temperature. The next day, the mixture was diluted with water (50 mL) and extracted with EtOAc (3×50 mL), the organic layer was concentrated under vacuum and purified by silica-gel chromatography (Petroleum ether/ethyl acetate=10:1) to give the compound of formula (IV) (56.2 g, yield: 32%) as a white solid.

Step 7a: Synthesis of the compound of formula (V)

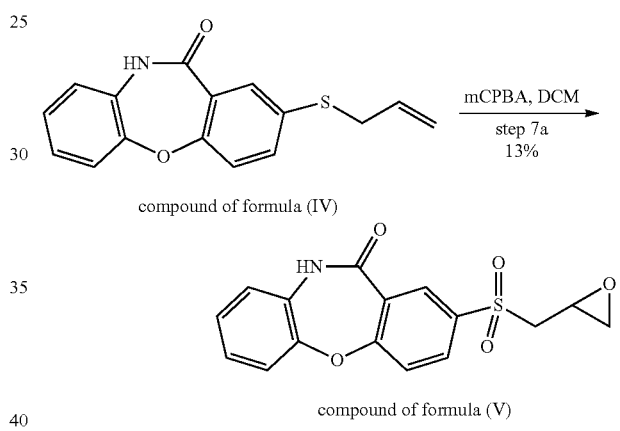

mCPBA (1.8 g, 10.6 mmol, 15 equiv.) was added to a stirred solution of the compound of formula (IV) (200.0 mg, 0.7 mmol, 1.0 equiv.) in DCM (5 mL) at 0° C., and the mixture was stirred at room temperature for 24 h. The reaction was quenched with saturated Na₂S₂O₃ and saturated NaHCO₃ solutions under ice cooling, and the mixture was extracted with ethyl acetate. The combined organic layer was washed with saturated Na₂S₂O₃ solution, saturated NaHCO₃ solution, water, and brine, dried over Na₂SO₄, and concentrated under reduced pressure. The resultant residue was purified by silica gel column chromatography (Petroleum ether: ethyl acetate=3:1) to give compound of formula (V) (29.8 mg, 13%) as a white solid.

Step 8: Synthesis of the compound of formula (VI)

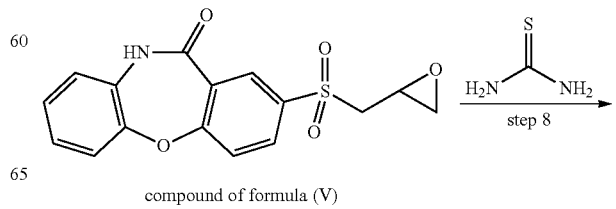

compound of formula (V)

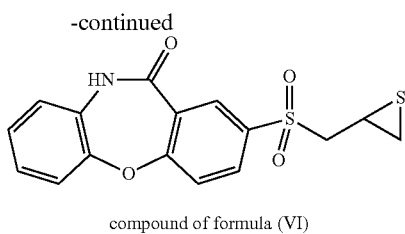

compound of formula (VI)

Thiourea (456.0 mg, 6.0 mmol, 2.5 eq) was added in portions to a solution of the compound of formula (V) (800.0 mg, 2.4 mmol, 1.0 equiv.) in a mixture of MeOH (15 mL) and THF (5 mL) and stirred overnight at room temperature. Then the solvent was evaporated under reduced pressure and dissolved in water, extracted with EtOAc. The organic layer was concentrated under vacuum and the residue was purified with silica-gel chromatography (Hexane/EtOAc=2:1) to give the compound of formula (VI) (500 mg, yield: 59.6%) as a white solid.

Steps 7b & 9: Synthesis of the compound of formula (VII)

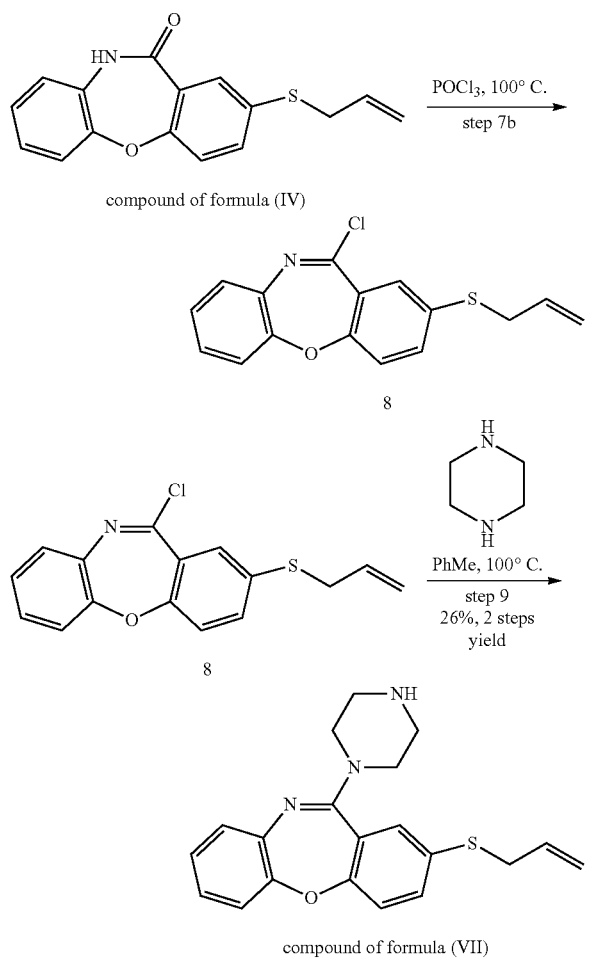

compound of formula (VII)

The compound of formula IV (310.0 mg, 1.0 mmol, 1.0 equiv.) was added to $POCl_3$ (5 mL) and heated at reflux overnight. Excess $POCl_3$ was evaporated under reduced pressure to give the crude compound 8. Dry toluene (5 mL) and Piperazine (1.6 g, 15.0 mmol, 15.0 equiv.) were added to compound 8, and the mixture was heated at reflux for 2 h before allowing it to cool down to room temperature. EtOAc and water were added and the aqueous layer was extracted one more time with EtOAc. The combined organic layers were dried over $Na_2SO_4$. Evaporation of the solvent yielded the crude product, which was purified by Prep-HPLC (ACN/water as eluent, TFA as additive). The pH of the eluent was adjusted to pH 7 and extracted with DCM, the organic layer was concentrated to give the compound of formula (VII) (100.0 mg, yield: 26%) as a yellow oil.

Example 2

As explained above, the L-OPA1 to S-OPA1 ratio is a determinant for energy metabolism and cell survival regulated by YME1L1 and OMA1. Referring to FIG. 1, the YME1L1 protease adapts the OPA1 ratios to the cellular energy demands under physiological conditions. The OMA1 protease on the other hand converts all OPA1 isoforms to S-OPA1 under conditions broadly defined as stress-conditions.

A nonlimiting example of a method of testing compounds for their efficacy to induce OPA1-cleavage and/or OMA1 activation is provided in FIG. 1, for which human 293T cells or mouse Neuro2A cells were treated with different agents and subsequently tested for OPA1-hydrolysis by Western blotting. Referring to FIG. 1B, treatment of 293T cells with the mitochondrial uncoupler CCCP (CAS #555-60-2) for 30 minutes resulted in L-OPA1 cleavage. OPA1 cleavage in these experiments is OMA1 dependent, because knockdown of the protease preserved L-OPA1 (FIG. 1B & 1C).

Nonlimiting examples of a compound lowering the threshold-levels for OPA1 cleavage and/or OMA1 activation are provided in FIG. 1D. 293T cells were incubated for 60 minutes with MMP2/9 inhibitor IV (CAS #292605-14-2), temozolomide (CAS #85622-93-1) or amoxapine (CAS #14028-44-5), before 1 μM CCCP was added for an additional 30 minutes. Treatment with 1 μM CCCP or 30 μM MMP2/9 inhibitor IV did not induce OPA1 cleavage. However, 1 μM CCCP led to OPA1 cleavage in cells pretreated with MMP2/9 inhibitor IV. This demonstrates that MMP2/9 inhibitor IV can reduce the threshold-levels for OPA1 cleavage (see also Example 4 herein and Example 5 in PCT/US2017/064195).

The cancer drug temozolomide, on the other hand, had no impact on OPA1 cleavage even when combined with CCCP or MMP2/9 inhibitor IV (FIG. 1D). This suggests that temozolomide acts by targeting a different pathway. Because of the different mechanisms of action targeted by temozolomide and the compounds of present invention, it can be deduced that a subject may benefit from combination therapies of temozolomide or its derivates with compounds of present invention. In some embodiments, a compound of present invention is combined with temozolomide for the treatment of cancer. In one embodiment, such cancer is a brain tumor. In one embodiment, such cancer is glioma and/or glioblastoma. In certain embodiments, a pharmaceutical composition comprising an effective amount of a compound of present invention and an effective amount of temozolomide or a derivate thereof or a prodrug thereof or a pharmaceutical acceptable salt thereof is administered to a subject with cancer. In another embodiment, a pharmaceutical composition comprising an effective amount of a compound of present invention is administered to an individual being treated with temozolomide.

Another example of a compound lowering threshold-levels for OPA1 cleavage and/or OMA1 activation is amoxapine. Treatment of 293T cells with 100 µM amoxapine for 90 minutes had no effect on OPA1 cleavage by itself. Very unexpectedly and quite surprisingly, however, preincubation with amoxapine lowered the critical CCCP-concentration for OMA1 activation. As a result, OPA1 cleavage was observed at 1 µM CCCP (FIG. 1D). The effects of amoxapine are similar to the effects observed with MMP2/9 inhibitor IV, and equally surprising. In certain embodiments, a pharmaceutical composition comprising an effective amount of amoxapine or a derivate, a prodrug or a pharmaceutical acceptable salt thereof and an effective amount of temozolomide or a derivate, a prodrug or a pharmaceutical acceptable salt thereof is administered to a subject with cancer. In one embodiment, such cancer is a brain tumor. In one embodiment, such cancer is glioma and/or glioblastoma.

Another example is provided in FIG. 1E, for which Neuro2A cells were treated with different reagents for 30 minutes or 3 hours prior to the assessment of OPA1 by Western blotting. Some compounds acted faster while others were slower in altering the OPA1 ratios. For example, 30 minutes of sorafenib showed only little effect, while L-OPA1 was completely converted after 3 hours of sorafenib treatment. Trichostatin A had no effect even after 3 hours of treatment. On the other hand, 5 µM CCCP or 1 µM valinomycin were enough to induce OPA1 cleavage within 30 minutes (FIG. 1E). In certain embodiments, a pharmaceutical composition comprising an effective amount of sorafenib or a derivate, a prodrug or a pharmaceutical acceptable salt thereof and an effective amount of temozolomide or a derivate, a prodrug or a pharmaceutical acceptable salt thereof is administered to a subject with cancer.

Example 3

Figure 6:
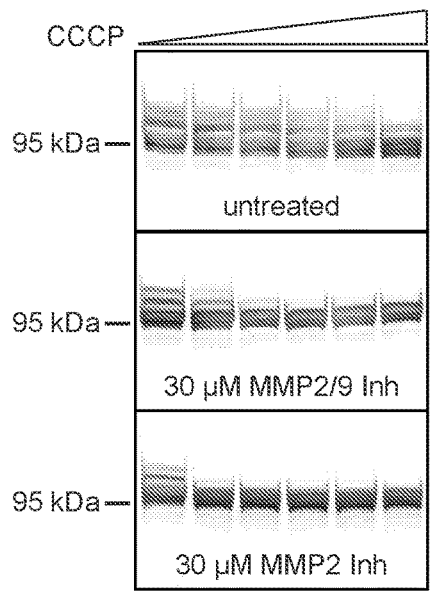
FIG. 6. A: 293T cells were treated with 0 µM, 1 µM, 2 µM, 3 µM, 4 µM, or 5 µM CCCP for 30 minutes after which OPA1 was analyzed by Western blotting. B: 293T cells were incubated for 60 minutes with increasing concentrations of MMP2/9 inhibitor IV (panels on the left) and MMP2 inhibitor II (right) before 0 µM, 2 µM or 5 µM CCCP was added for another 30 minutes and OPA1 analyzed by Westerns. C: MMP2/9 inhibitor IV dose-response in 293T cells treated with 2 µM CCCP. D: Amoxapine dose-response in 293T cells treated with 1 µM CCCP. E: OPA1 cleavage in Neuro2A cells treated with 30 µM of the indicated agents for 90 minutes (60 min preincubation plus 30 min of CCCP). MMP2/9 Inh.: MMP2/9 inhibitor IV; MMP2 Inh.: MMP2 inhibitor II; Amo.: amoxapine.
Figure 6:
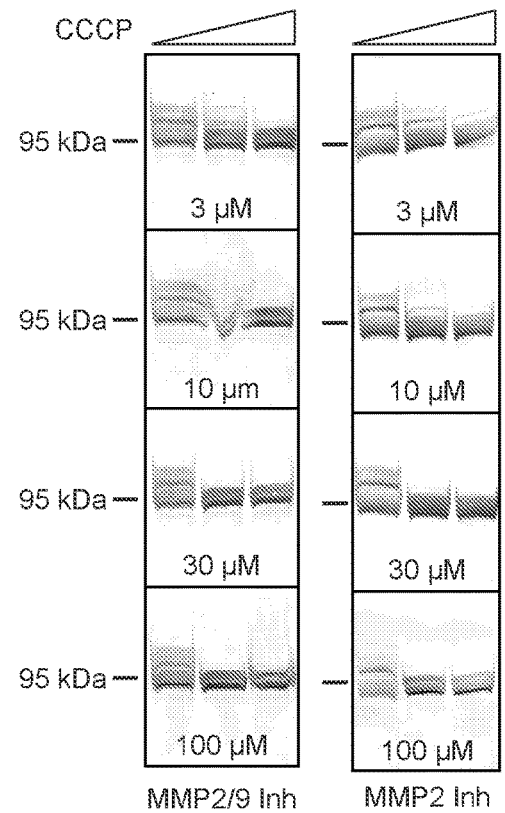
Figure 6:
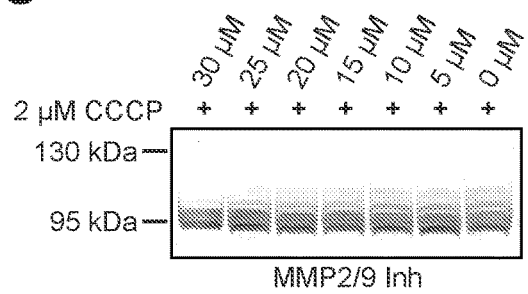
Figure 6:
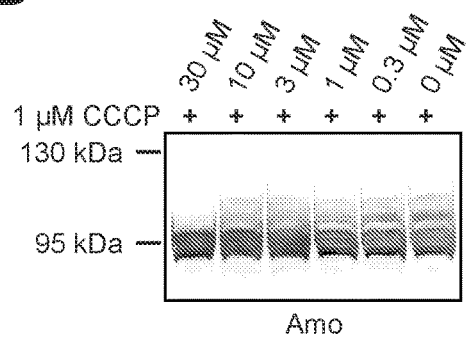
Figure 6:
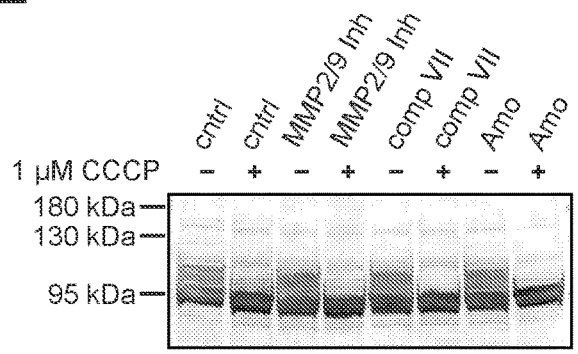

A nonlimiting example illustrates specific features of certain compounds disclosed herein and teaches how potency of such compounds can be further improved. To this end, compound were analyzed for their potential to lower threshold-levels for OPA1 cleavage and/or OMA1 activation using the methods described in Example 3. In one example, L-OPA1 was cleaved in untreated 293T cells at concentrations ≥5 µM CCCP (FIG. 6A, top panel). Preincubation of the cells with 30 µM MMP2/9 inhibitor IV for 60 minutes prior to the addition of CCCP for another 30 minutes lowered the critical CCCP concentration to about 2 µM (FIG. 6B, middle panel). Preincubation with 30 µM MMP2 inhibitor II (CAS #869577-51-5) lowered the threshold-level even further to about 1 µM CCCP (FIG. 6C, bottom panel). The skilled artisan can recognize how (and the not-so-skilled artisan certainly appreciates that) substitutions and modifications of the thiirane-opposed end of the molecule increased potency. In certain embodiments of present invention, the ring that does not carry the group of formula (II) is modified, such modifications being readily known in the arts (see, inter alia, U.S. Pat. Nos. 7,928,127, 8,093,287, and 9,321,754).

Figure 7:
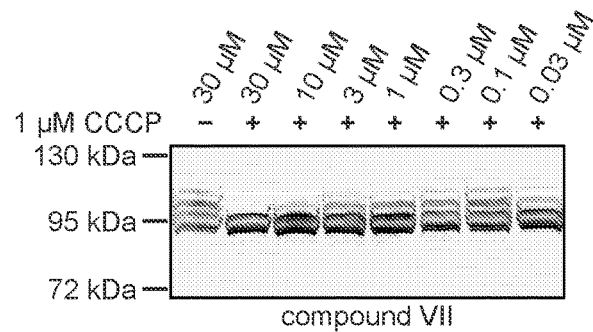
FIG. 7. Compounds of present invention can lower CCCP-levels for OMA1 activation gauged by OPA1 cleavage in Western blots. A-C: 293T cells were treated with the denoted concentrations of compound VII, IV and V for 60 minutes before CCCP was added for an additional 30 minutes. D-E: 293T cells were treated with the denoted concentrations of compound VII, IV and V for 6 hours before CCCP was added for an additional 30 minutes.
Figure 7:
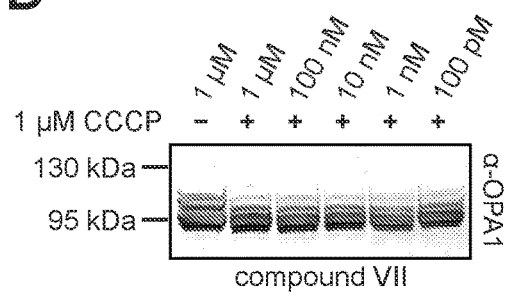
Figure 7:
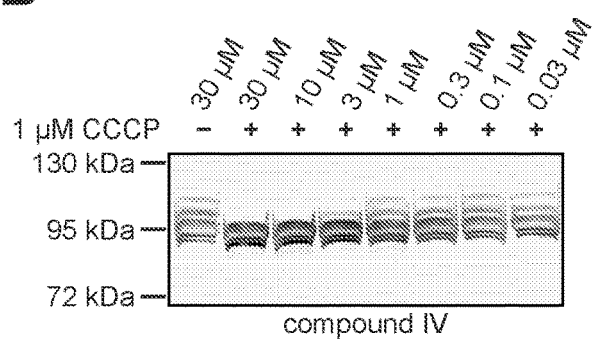
Figure 7:
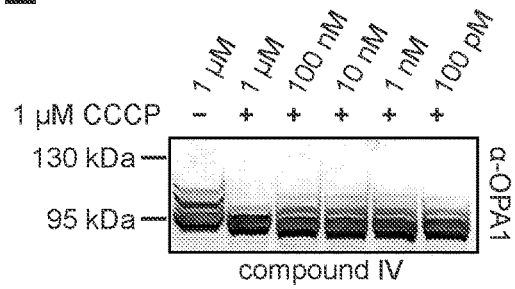
Figure 7:
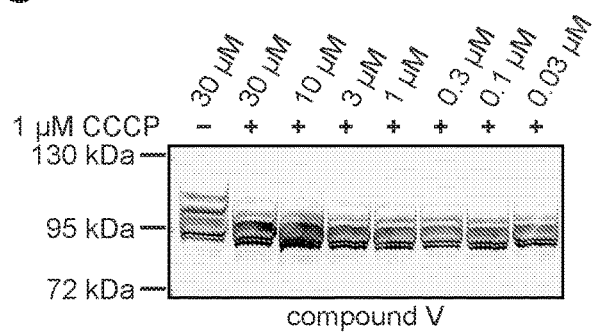
Figure 7:
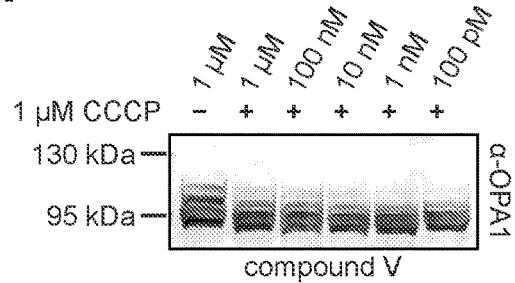

The examples presented in FIGS. 6B-E demonstrate that the effective dose in cells treated with MMP2/9 inhibitor IV, MMP2 inhibitor II, and amoxapine for 60 minutes was about 30 µM. Compounds of present disclosure had better potency. For example, the effective dose of the compound of formula (VII) in 293T cells treated for 60 minutes was about 10 µM (FIG. 7A). The effective dose of the compound of formula (IV) was with about 3 µM (FIG. 7B) an order of magnitude better than the effective dose of amoxapine or MMP2 Inhibitor II. The compound of formula (V) showed some efficacy. However, not all L-OPA1 isoforms were efficiently cleaved in the presence of compound V (FIG. 7C). Extended pre-incubation of 6 hours before adding CCCP for an additional 30 minutes improved potency of compound V to about 1 µM but did result in OPA1 cleavage at the tested concentrations of compounds VII and V (FIGS. 7D-E). Note, incubation with 30 µM of the compounds for 90 minutes and incubation with 1 µM of the compounds for 390 minutes had no major impact on the L-OPA1 isoforms in the absence of CCCP (FIG. 7).

The skilled artisan will apprehend from the provided example that replacing amoxapine's chloride with an allyl sulfide in compound VII increased potency by a factor of about 3. Replacing the piperazine with an oxygen in compound IV further improved potency by about 10-fold compared to amoxapine. The sulfonyl oxirane of compound V engaged the target, but showed overall little activity.

Example 4

Figure 8:
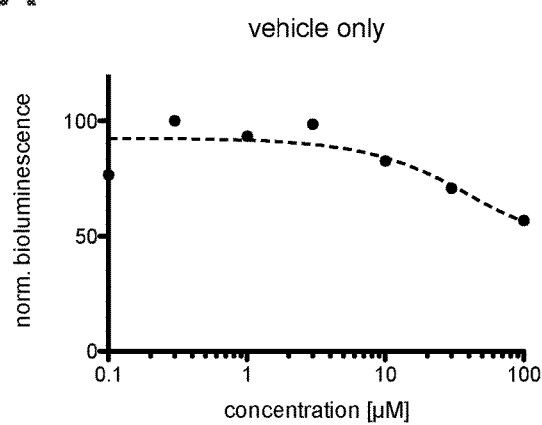
FIG. 8. 293T cells expressing a luciferase-based cellular reporter were incubated for 1 hour with increasing concentrations of the denoted compounds in cell culture media with 30 nM valinomycin before luciferase substrate was added and light emission measured. OMA1 activity decreases the light signal of the reporter in this assay. A: Vehicle only. B: MMP2/9 inhibitor IV. C: amoxapine. D: compound VII. E: compound IV. F: compound V.
Figure 8:
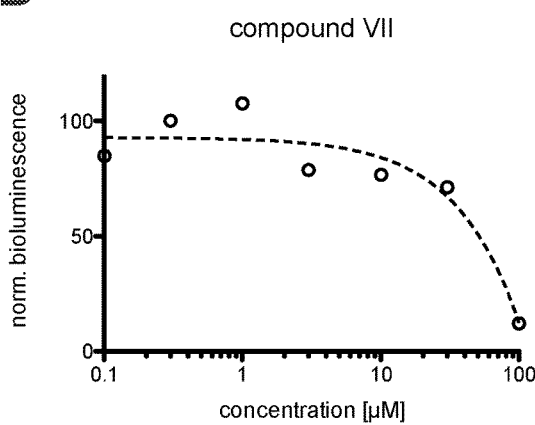
Figure 8:
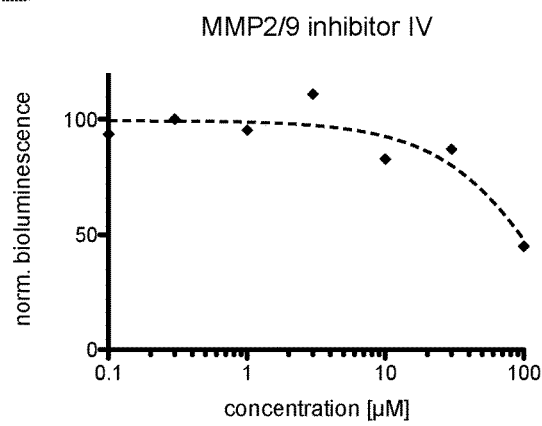
Figure 8:
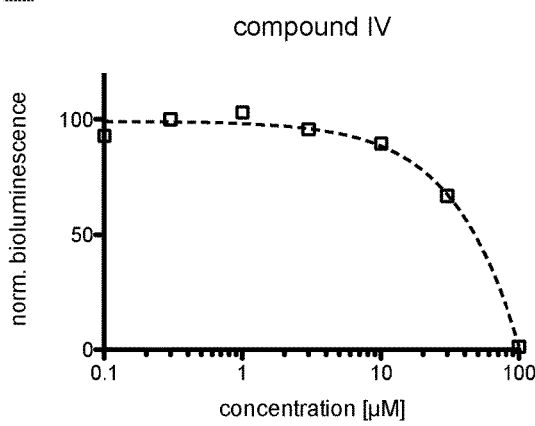
Figure 8:
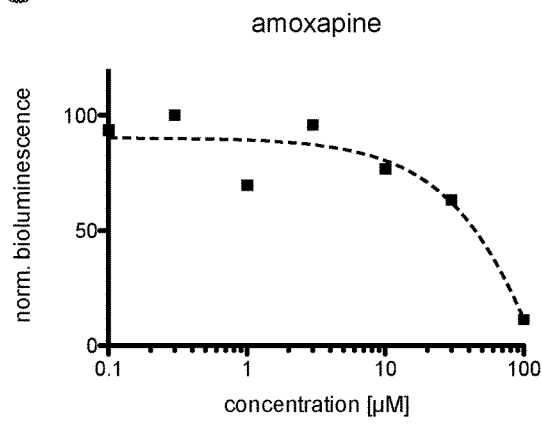
Figure 8:
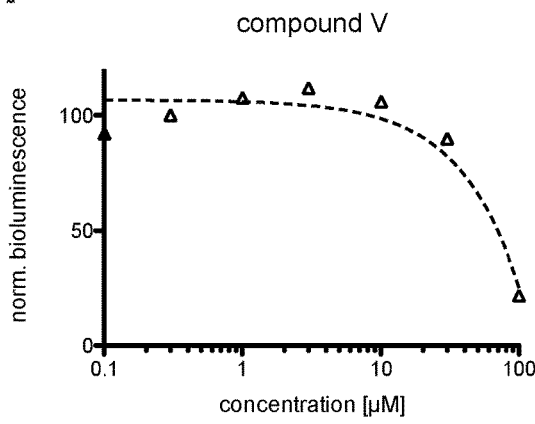

The following non-limiting examples illustrate some aspects of the mechanism of action of the compounds disclosed herein. An alternative method of measuring enzymatic OMA1 activity makes use of a luciferase-based cellular reporter, which can be transiently or stably expressed in eukaryotic cells. In this assay, OMA1 cleaves the reporter enzyme upon activation and thereby obliterates the luciferase signal. 293T cells stably transfected with the reporter enzyme were incubated with increasing concentrations of a compound and 30 nM valinomycin. Valinomycin is known in the art to induce OPA1 cleavage (see, for example, Head B., et al. "Inducible proteolytic inactivation of OPA1 mediated by the OMA1 protease in mammalian cells." *J Cell Biol.* 2009; 187(7):959-66, as well as FIG. 1E). 30 nM valinomycin alone had only little effects (FIG. 8A). On the other hand, all tested compounds reduced the light-signal emitted by the reporter to a certain extend at higher concentrations (FIGS. 8B-F). This specific example illustrates how compounds of present invention can activate OMA1 under conditions that would otherwise not lead to OMA1 activation. This example also provides an independent validation of the results obtained by Western blotting.

Figure 9:
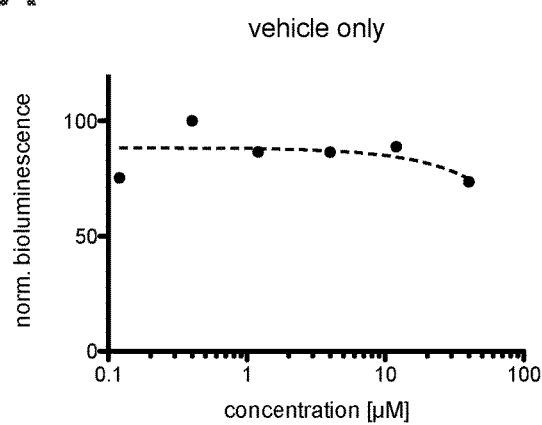
FIG. 9. 293T cells expressing a luciferase-based cellular reporter were incubated overnight with increasing concentrations of the denoted compounds. Luciferase substrate was added the next day and light emission measured. A: Vehicle only. B: MMP2/9 inhibitor IV. C: amoxapine. D: compound VII. E: compound IV. F: compound V.
Figure 9:
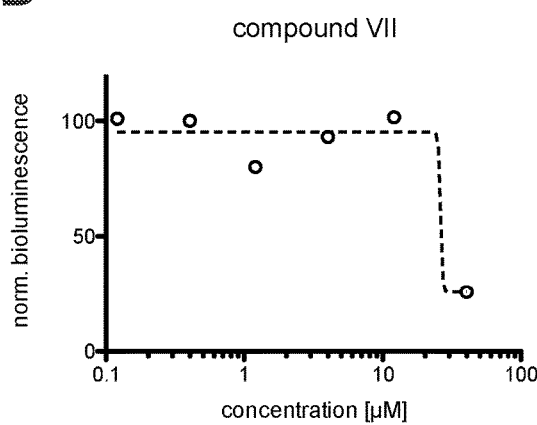
Figure 9:
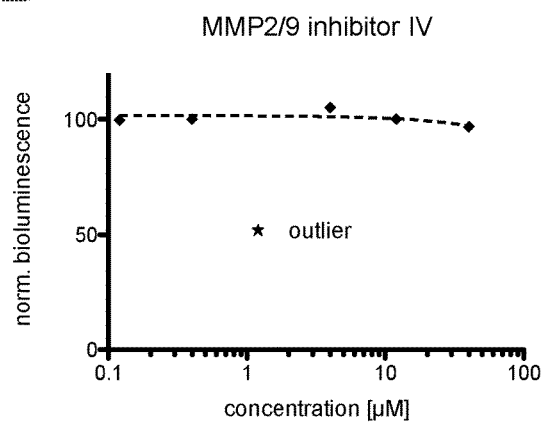
Figure 9:
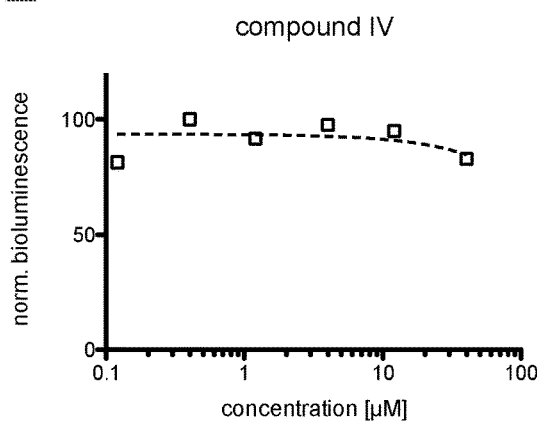
Figure 9:
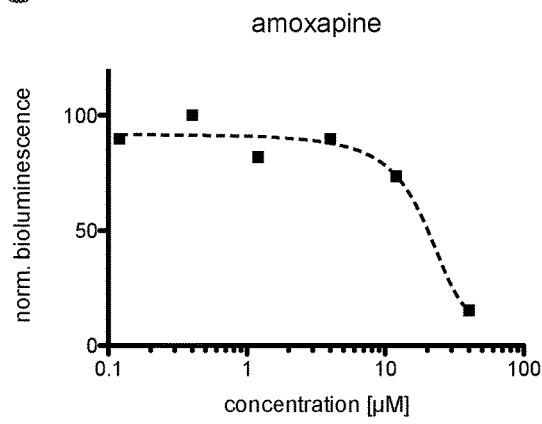
Figure 9:
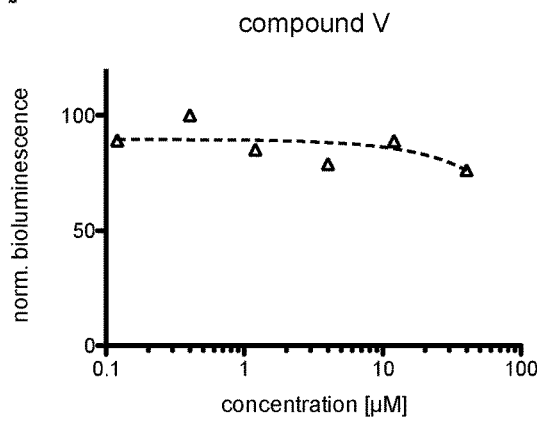

Incubation time is a variable of OMA1 activation for certain compounds (see, for example, sorafenib in FIG. 1E). To investigate whether compounds of present disclosure would activate OMA1 in the absence of a stress-stimulus such as CCCP or valinomycin, reporter cells were incubated with increasing compound concentrations overnight (FIG. 9). OMA1 activation was noted the next day for 40 µM amoxapine (FIG. 9C) and for 40 µM compound VII (FIG. 9D), while all other compounds had no impact on OMA1 activity in this particular example (FIGS. 9A, B, E and F). These results are in line with data obtained by Western blotting. For example, even higher concentrations of 100 µM MMP2/9 inhibitor IV for 90 minutes had no effects on L-OPA1 (see FIG. 6B). But also 100 µM amoxapine for 90 minutes had no perceptible effects (see FIG. 1D). The skilled artisan will recognize that amoxapine's slow dynamics of OMA1 activation over extended time periods is comparable to the effects observed with sorafenib, which suggests that amoxapine interacts with more than one drug target. These additional pathways targeted by amoxapine eventually result in OMA1 activation as well (as is the case for sorafenib). The skilled artisan will further understand that compound VII has some off-target effects similar to amoxapine, which can be reduced by the removal of the piperazine group. As explained in the preceding example 4, replacing the piperazine with an oxygen in compound IV can improve potency and reduce off-target effects.

Example 5

Figure 10:
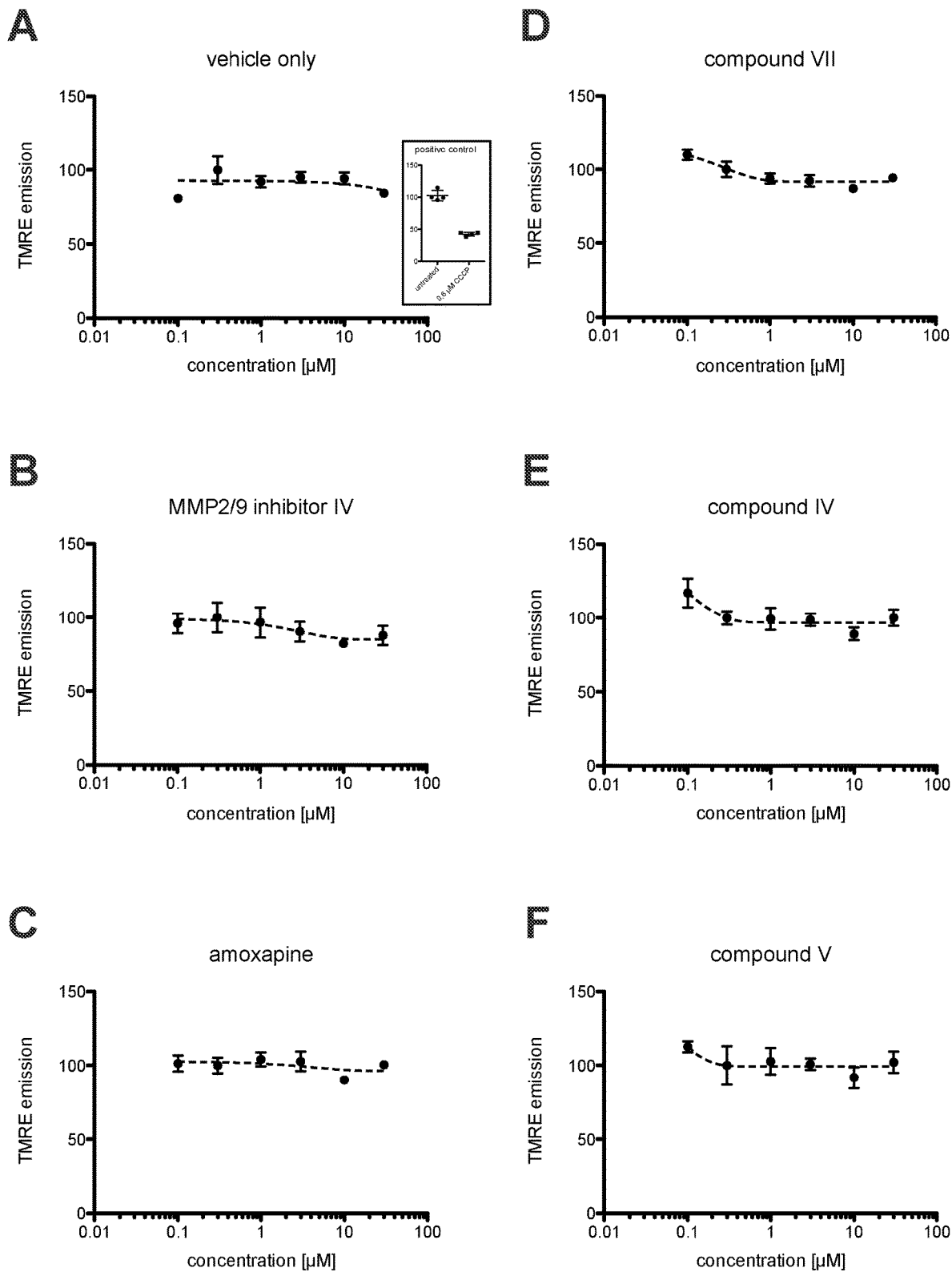
FIG. 10. The mitochondrial inner membrane potential Δψ was measured with a cellular TMRE-assay, in which a reduction of Δψ results in a reduced TMRE signal (see insert in A). The denoted compounds had only little impact on Δψ in 293T cells after 18 hours of treatment. A: Vehicle only. B: MMP2/9 inhibitor IV. C: amoxapine. D: compound VII. E: compound IV. F: compound V.

The following non-limiting examples illustrate the specificity of compounds of present invention. Numerous examples herein and in the art demonstrate that OMA1 is readily activated by CCCP (see, for example, FIG. 1B). It is well established in the art that CCCP can lower the mitochondrial membrane potential Δψ. To investigate whether compounds disclosed herein would activate OMA1 simply by lowering Δψ, compounds of present invention were further characterized by a TMRE live-cell assay. Δψ reduction results in such assay in a reduced TMRE signal. 293T cells were cultured overnight with different compound concentrations after which TMRE fluorescence was measured with a fluorescence plate-reader (FIG. 10). Compounds of present invention had only little impact on the mitochondrial membrane potential Δψ, while 0.6 μM CCCP significantly reduced the TMRE signal (see insert in FIG. 10A). This particular example, supports a mechanism directly targeting the OMA1 pathway and makes a generic mode of action, such as the effects evoked by CCCP, less likely.

Figure 11:
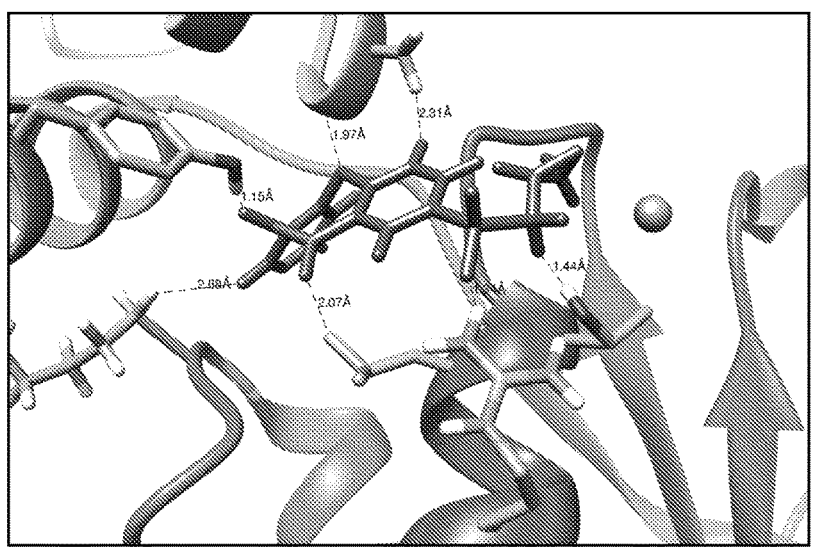
FIG. 11. A: A likely binding pose of a compound of present invention illustrates aspects of the drug-target interaction. B: 293T cells were treated with the denoted concentrations of compound for 90 minutes before cells were harvested and analyzed by OPA1 Western blotting. C: 293T cells were treated with the denoted concentrations of compound VI for 60 minutes and another 30 minutes with 1 µM CCCP before cells were harvested and analyzed by OPA1 Western blotting.
Figure 11:
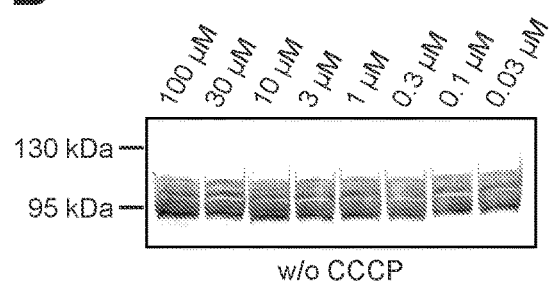
Figure 11:
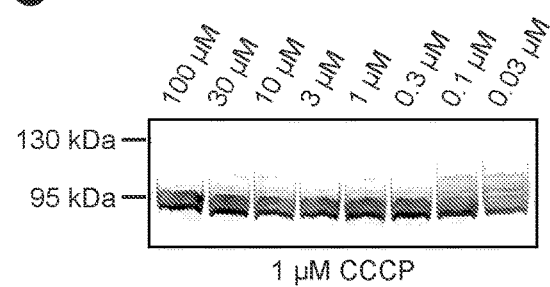

The drug-target interaction was investigated by molecular docking of compounds of present invention to the alleged binding pocket. A merely illustrative example of such a drug-target interaction is shown in FIG. 11A. The dibenzoxazepin fits nicely into the protein groove without steric hindrances. The compound backbone is predicted to contact the target protein via 7 bridges of less than 3 U in length. The thiirane-group is shown oriented towards the metal ion. It is known in the art that the thiirane-ring can open up upon a nucleophilic attack thereby entering a tighter binding mode with the target-protein (see, for example, U.S. Pat. No. 8,093,287). Such mechanism-based target-engagement may apply for compounds of present invention as well. Supporting this notion is the fact that the compound of formula (VI) of present disclosure has an effective dose of 300 nM (FIGS. 11B & C), which is 10-times better than compound IV (3 μM; FIG. 7B), which carries an allyl sulfonyl group. Compound VI is 100-times more potent in inducing OPA1 hydrolysis than MMP2/9 inhibitor IV (30 μM; FIG. 6C) or amoxapine (30 μM; FIG. 6D). Referring to FIG. 11B, treatment of 293T cells for 90 minutes with up to 100 μM compound VI did not induce OPA1 cleavage in the absence of CCCP. In this particular example, 300 nM were enough to fully convert all L-OPA1 isoforms in the presence of 1 μM CCCP (FIG. 11C).

Without further elaboration, it is believed that one skilled in the art can, using the preceding description and examples, utilize the present invention to its fullest extent. The preceding preferred specific embodiments are, therefore, to be construed as merely illustrative, and not limitative of present disclosure in any way whatsoever. Although the foregoing invention has been described in some detail by way of illustration and example for purposes of clarity of understanding, one of skill in the art will appreciate that certain changes and modifications may be practiced within the scope of the appended claims. In addition, each reference and citation provided herein is incorporated by reference in its entirety to the same extent as if each reference and citation was individually incorporated by reference. Where a conflict exists between the instant application and a reference provided herein, the instant application shall dominate.

LITERATURE CITED

Alavi M. V. (2020) "OMA1—An integral membrane protease" *Biochim Biophys Acta Proteins Proteom.* 2020 October 29:140558.

Alavi, M. V. (2019). "Targeted OMA1 therapies for cancer." *Int J Cancer* 145(9): 2330-41.

Alavi M V & Fuhrmann N (2013) "Dominant optic atrophy, OPA1, and mitochondrial quality control: understanding mitochondrial network dynamics." *Mol Neurodegener.* 25;8:32.

Berge, S. M., et al. (1977). "Pharmaceutical Salts," *J. Pharm. Sci.*, 66: 1-19.

Gooyit, M., et. al. (2011). "Selective water-soluble gelatinase inhibitor prodrugs." *J Med Chem.* 54(19): 6676-90.

Head, B., et al. (2009). "Inducible proteolytic inactivation of OPA1 mediated by the OMA1 protease in mammalian cells." *J Cell Biol.* 187(7): 959-66.

Kong, B. Q., et. al. (2014). "p53 is required for cisplatin-induced processing of the mitochondrial fusion protein L-Opa1 that is mediated by the mitochondrial metallopeptidase Oma1 in gynecologic cancers." *J Biol Chem* 289(39): 27134-45.

Pal, H. C., et. al. (2017). "Cryptolepine inhibits melanoma cell growth through coordinated changes in mitochondrial biogenesis, dynamics and metabolic tumor suppressor AMPKalpha1/2-LKB1." *Sci Rep* 7(1): 1498.

Rautio J, et al. (2008) "Prodrugs: design and clinical applications." *Nat Rev Drug Discov.* 7(3): 255-70.

Santin, G., et. al. (2013). "Mitochondrial fusion: a mechanism of cisplatin-induced resistance in neuroblastoma cells?" *Neurotoxicology* 34: 51-60.

Tang, Q., et. al. (2018). "Dynamin-related protein 1-mediated mitochondrial fission contributes to IR-783-induced apoptosis in human breast cancer cells." *J Cell Mol Med* 22(9): 4474-4485.

Tsvelikhovsky D, et al., (2011) "Concise palladium-catalyzed synthesis of dibenzodiazepines and structural analogues." *J Am Chem Soc.* 133(36): 14228-31.

Zhao, X., et. al. (2013). "OPA1 downregulation is involved in sorafenib-induced apoptosis in hepatocellular carcinoma." *Lab Invest* 93(1): 8-19.

What is claimed is:

1. A compound of formula (I)

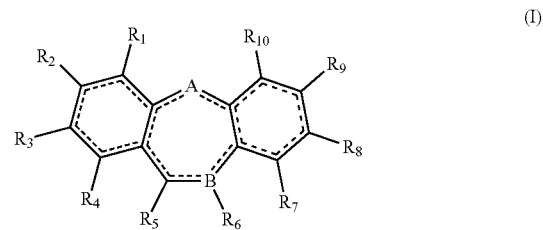

or a stereochemical isomeric form thereof, wherein

A is an alkyl, alkylene, alkenyl, alkynyl, alkylidene, —N(H)—, —N($R_{11}$)—, —N(OH)—, —S(O)$_2$—, —S(O)—, —O—, or the like;

B is C, N, O, P, or S provided that when B represents N or O then B may or may not be substituted at $R_6$;

$R_1$, $R_2$, $R_3$, $R_4$, $R_5$, $R_6$, $R_7$, $R_8$, $R_9$, $R_{10}$, $R_{11}$, or $R_{12}$ is hydrogen, halo, hydroxy, carboxy, keto, alkyl, alkylene, haloalkyl, polyhaloalkyl, haloalkoxy, nitrile, carbocyclic residue, aryl, aryloxy, arylamino, arylalkylamino, arylthio, arylalkanoylamino, arylsulfonyl, arylalkoxy, arylsulfinyl, arylheteroaryl, arylalkylthio, arylcarbonyl, arylalkenyl, or arylalkylsulfonyl, alkynyl, alkenyl, alkyloxy, polyhaloalkyloxy, alkylidene, cycloalkyl, cycloalkanone, heterocyclic group, heteroaryl, —C(O)OR$_{12}$, —NR$_{13}$R$_{14}$, —C(O)NR$_{13}$R$_{14}$ or the like, wherein NR$_{13}$R$_{14}$ may form a heterocyclic ring, or a chemical group;

and wherein at least one of $R_1$, $R_2$, $R_3$, $R_4$, $R_7$, $R_8$, $R_9$, or $R_{10}$ is a group of formula (II)

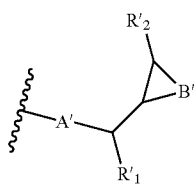

(II)

or a stereochemical isomeric form thereof, wherein
A' is a sulfonyl group (—S(O)$_2$—);
B' is N, O, P or S; and
R'$_1$ or R'$_2$ is hydrogen, halo, hydroxy, carboxy, keto, alkyl, alkylene, haloalkyl, polyhaloalkyl, haloalkoxy, nitrile, carbocyclic residue, aryl, aryloxy, arylamino, arylalkylamino, arylthio, arylalkanoylamino, arylsulfonyl, arylalkoxy, arylsulfinyl, arylheteroaryl, arylalkylthio, arylcarbonyl, arylalkenyl, or arylalkylsulfonyl, alkynyl, alkenyl, alkyloxy, polyhaloalkyloxy, alkylidene, cycloalkyl, cycloalkanone, heterocyclic group, heteroaryl, —C(O)OR$_{12}$, —NR$_{13}$R$_{14}$, —C(O)NR$_{13}$R$_{14}$ or the like, wherein NR$_{13}$R$_{14}$ may form a heterocyclic ring, or a chemical group;

or a pharmaceutically acceptable salt thereof, or an N-oxide thereof.

2. The compound of claim 1, wherein B' is S or O; and R'$_1$ and R'$_2$ are both hydrogens.

3. The compound of claim 1, wherein the group of formula (II) is a group of formula (III)

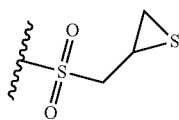

(III)

or a stereochemical isomeric form thereof.

4. The compound of claim 2, wherein A is O; B is N; and $R_3$ and/or $R_8$ is a group of formula (II).

5. A pharmaceutical composition comprising a compound of claim 1 and a pharmaceutically acceptable carrier, wherein the compound is provided in an effective amount for the treatment of a subject in need of such a treatment.

6. The pharmaceutical composition of claim 5, wherein the compound is one or more 1-((thiiran-2-ylmethyl)sulfonyl)dibenzo[b,f][1,4]oxazepin-11(10H)-one,
2-((thiiran-2-ylmethyl)sulfonyl)dibenzo[b,f][1,4]oxazepin-11(10H)-one,
3-((thiiran-2-ylmethyl)sulfonyl)dibenzo[b,f][1,4]oxazepin-11(10H)-one,
4-((thiiran-2-ylmethyl)sulfonyl)dibenzo[b,f][1,4]oxazepin-11(10H)-one,
7-((thiiran-2-ylmethyl)sulfonyl)dibenzo[b,f][1,4]oxazepin-11(10H)-one,
8-((thiiran-2-ylmethyl)sulfonyl)dibenzo[b,f][1,4]oxazepin-11(10H)-one,
9-((thiiran-2-ylmethyl)sulfonyl)dibenzo[b,f][1,4]oxazepin-11(10H)-one,
10-((thiiran-2-ylmethyl)sulfonyl)dibenzo[b,f][1,4]oxazepin-11(10H)-one,
1-((oxiran-2-ylmethyl)sulfonyl)dibenzo[b,f][1,4]oxazepin-11(10H)-one,
2-((oxiran-2-ylmethyl)sulfonyl)dibenzo[b,f][1,4]oxazepin-11(10H)-one,
3-((oxiran-2-ylmethyl)sulfonyl)dibenzo[b,f][1,4]oxazepin-11(10H)-one,
4-((oxiran-2-ylmethyl)sulfonyl)dibenzo[b,f][1,4]oxazepin-11(10H)-one,
7-((oxiran-2-ylmethyl)sulfonyl)dibenzo[b,f][1,4]oxazepin-11(10H)-one,
8-((oxiran-2-ylmethyl)sulfonyl)dibenzo[b,f][1,4]oxazepin-11(10H)-one,
9-((oxiran-2-ylmethyl)sulfonyl)dibenzo[b,f][1,4]oxazepin-11(10H)-one,
10-((oxiran-2-ylmethyl)sulfonyl)dibenzo[b,f][1,4]oxazepin-11(10H)-one,
1-((thiiran-2-ylmethyl)sulfonyl)dibenzo[b,f][1,4] oxazepine,
2-((thiiran-2-ylmethyl)sulfonyl)dibenzo[b,f][1,4] oxazepine,
3-((thiiran-2-ylmethyl)sulfonyl)dibenzo[b,f][1,4] oxazepine,
4-((thiiran-2-ylmethyl)sulfonyl)dibenzo[b,f][1,4] oxazepine,
7-((thiiran-2-ylmethyl)sulfonyl)dibenzo[b,f][1,4] oxazepine,
8-((thiiran-2-ylmethyl)sulfonyl)dibenzo[b,f][1,4] oxazepine,
9-((thiiran-2-ylmethyl)sulfonyl)dibenzo[b,f][1,4] oxazepine,
10-((thiiran-2-ylmethyl)sulfonyl)dibenzo[b,f][1,4] oxazepine,
1-((oxiran-2-ylmethyl)sulfonyl)dibenzo[b,f][1,4] oxazepine,
2-((oxiran-2-ylmethyl)sulfonyl)dibenzo[b,f][1,4] oxazepine,
3-((oxiran-2-ylmethyl)sulfonyl)dibenzo[b,f][1,4] oxazepine,
4-((oxiran-2-ylmethyl)sulfonyl)dibenzo[b,f][1,4] oxazepine,
7-((oxiran-2-ylmethyl)sulfonyl)dibenzo[b,f][1,4] oxazepine,
8-((oxiran-2-ylmethyl)sulfonyl)dibenzo[b,f][1,4] oxazepine,
9-((oxiran-2-ylmethyl)sulfonyl)dibenzo[b,f][1,4] oxazepine, and
10-((oxiran-2-ylmethyl)sulfonyl)dibenzo[b,f][1,4] oxazepine.

7. The pharmaceutical composition of claim 5, wherein the compound is one or more N-(2-((thiiran-2-ylmethyl)sulfonyl)dibenzo[b,f][1,4] oxazepin-8-yl) acetamide,
2-((thiiran-2-ylmethyl)sulfonyl)dibenzo[b,f][1,4] oxazepine, 11-(piperazin-1-yl)-2-((1-(thiiran-2-yl)ethyl)sulfonyl)dibenzo[b,f][1,4]oxazepine,
8-(((3-methylthiiran-2-yl)methyl)sulfonyl)dibenzo[b,f][1,4]oxazepine,
8-((thiiran-2-ylmethyl)sulfonyl)-10,11-dihydrodibenzo[b,f][1,4]oxazepine,
N-(2-((2-methylthiiran-2-yl)sulfonyl)-11-(piperazin-1-yl)dibenzo[b,f][1,4]oxazepin-8-yl)methanesulfonamide,
8-((oxiran-2-ylmethyl)sulfonyl)benzo[f]pyrimido[4,5-b][1,4]oxazepin-6(5H)-one,
2-((2,3-dihydro-13bH-spiro[dibenzo[b,f]pyrrolo[1,2-d][1,4]oxazepine-1,4'-piperidin]-12-yl)sulfonyl)-2-(thiiran-2-yl)acetonitrile,
2-((3-morpholinodibenzo[b,f][1,2,4]triazolo[4,3-d][1,4]oxazepin-6-yl)sulfonyl)-2-(thiiran-2-yl)acetonitrile,
2-((thiiran-2-ylmethyl)sulfonyl)-10,11-dihydrodibenzo[b,f][1,4]oxazepine,
2-((10,11-dihydrodibenzo[b,f][1,4]oxazepin-2-yl)sulfonyl)-1-(thiiran-2-yl)ethan-1-one,
2-phenoxy-8-((thiiran-2-ylmethyl)sulfonyl)-10,11-dihydrodibenzo[b,f][1,4]oxazepine,
5-amino-4-(2-((8-bromo-9-ethyl-7-methyltetradecahydro-1H-dibenzo[a,d][7]annulen-2-yl)sulfonyl)-1-(thiiran-2-yl)ethyl)-1-(3-chlorophenyl)-1H-pyrazole-3-carbonitrile,
8-((thiiran-2-ylmethyl)sulfonyl)-3-(trifluoromethyl)-10,11-dihydrodibenzo[b,f][1,4]oxazepine,
9-((1-(thiiran-2-yl)cyclopenta-2,4-dien-1-yl)sulfonyl)-11,12-dihydro-1H-benzo[2,3][1,4]oxazepino[7,6-g]indole,
N-(10-oxo-8-((thiiran-2-ylmethyl) sulfonyl)-10,11-dihydrobenzo[f]pyrido[4,3-b][1,4]oxazepin-3-yl)acetamide,
11-chloro-2-((thiiran-2-ylmethyl)sulfonyl)dibenzo[b,f][1,4]oxazepine,
8-((thiiran-2-ylmethyl)sulfonyl)-5,11-dihydrodibenzo[b,e][1,4]oxazepine,
12-((thiiran-2-ylmethyl)sulfonyl)dibenzo[b,f][1,2,4]triazolo[4,3-d][1,4]oxazepine,
2-((thiiran-2-ylmethyl)sulfonyl)-11-(trifluoromethyl)dibenzo[b,f][1,4]oxazepine, and
11-methyl-2-((thiiran-2-ylmethyl)sulfonyl)dibenzo[b,f][1,4] oxazepine.

8. The compound of claim 1, wherein the compound is a compound of formula (VI)

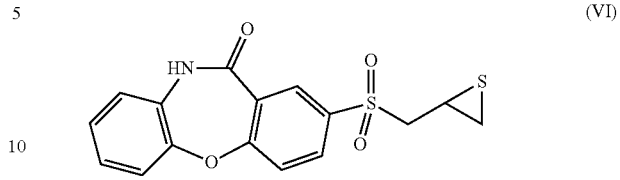

(VI)

or a stereochemical isomeric form thereof.

9. The pharmaceutical composition of claim 5, wherein the compound is a compound of formula (VI)

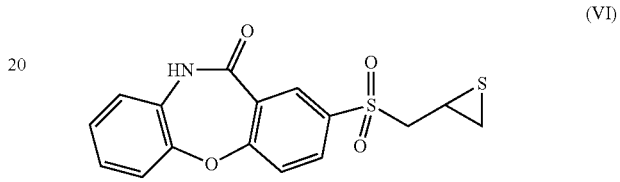

(VI)

or a stereochemical isomeric form thereof.

10. The pharmaceutical composition of claim 5, wherein the subject has a disease amenable to OMA1 and/or OPA1-modulatory therapies.

11. The pharmaceutical composition of claim 5 further comprising an effective amount of a cancer drug.

12. The pharmaceutical composition of claim 5 further comprising temozolomide or a derivate or a prodrug or a pharmaceutically acceptable salt thereof.

13. The pharmaceutical composition of claim 5 further comprising sorafenib or a derivate or a prodrug or a pharmaceutically acceptable salt thereof.

14. The pharmaceutical composition of claim 5, wherein the pharmaceutical composition is administered orally, sublingually, intravenously, infrasternally, transdermally, subcutaneously, intramuscularly, topically, rectally, vaginally, nasally or via the trigeminal nerve.

* * * * *